US006621865B1

United States Patent
Yu

(10) Patent No.: US 6,621,865 B1
(45) Date of Patent: Sep. 16, 2003

(54) METHOD AND SYSTEM FOR ENCODING AND DECODING MOVING AND STILL PICTURES

(75) Inventor: Yanbin Yu, Fremont, CA (US)

(73) Assignee: PowerLayer Microsystems, Inc., San Jose, CA (US)

( * ) Notice: Subject to any disclaimer, the term of this patent is extended or adjusted under 35 U.S.C. 154(b) by 405 days.

(21) Appl. No.: 09/664,129

(22) Filed: Sep. 18, 2000

(51) Int. Cl.$^7$ ................................................ H04N 7/18

(52) U.S. Cl. ............................... 375/240.16; 375/240.1

(58) Field of Search .......................... 375/240.1–240.19

(56) References Cited

U.S. PATENT DOCUMENTS

| | | |
|---|---|---|
| 2,740,071 A | 3/1956 | Goldmark |
| 2,851,522 A | 9/1958 | Hollywood |
| 4,030,121 A | 6/1977 | Faroudja |
| 5,349,383 A | 9/1994 | Parke |
| 5,384,598 A | 1/1995 | Rodriguez |
| 5,408,270 A | 4/1995 | Lim |
| 5,414,469 A | 5/1995 | Gonzales |
| 5,742,343 A | 4/1998 | Haskell |
| 5,818,531 A | 10/1998 | Yamaguchi |
| 5,844,617 A | 12/1998 | Faroudja |
| 5,963,257 A | 10/1999 | Katata |

(List continued on next page.)

OTHER PUBLICATIONS

Haskell, Barry G., Puri, Atul, and Netravali, Arun N., *Digital Video: An Introduction to MPEG–2*, ISBN 0–412–08411–2, 1996, pp. 200–201.

Robin, Michael, *Digital Television Fundamentals: Design and Installation of Video and Audio Systems*, ISBN 0–07–135581–2, 2000.

Solari, Stephen J., *Digital Video and Audio Compression*, ISBN 0–07–059538–0, 1997.

*Primary Examiner*—Andy Rao
(74) *Attorney, Agent, or Firm*—Oppenheimer Wolff & Donnelly, LLP; Anthony B. Diepenbrock, III

(57) ABSTRACT

A multi-dimensionally layered encoding and decoding system having reduced the bandwidth requirements for a channel that carries an image stream encoded by the system. A source image stream is partitioned multi-dimensionally into a lower resolution layer and higher resolution layer image stream. The lower resolution image stream is encoded and decoded in accordance with certain accepted standards such as MPEG-2, MPEG-4 and JPEG. In the encoding of the lower layer image stream, a number of indicator signals are derived that indicate where a compression loss and resolution loss occurs. Additionally, the lower layer image stream is non-linearly processed to create an improved image stream and non-linear indicator for use in the upper-layer encoder. The upper-layer encoder uses the non-linear processed image stream and a decoded, reconstructed upper-layer encoded stream to derive the motion vectors and prediction frames in a motion compensation process. The upper-layer encoder uses the nonlinear processed image stream and indicators as well as motion compensation prediction frames to form a number of difference image streams which are evaluated for their information content. One of the difference image streams having the lowest information content or statistical variance and acceptable quality is selected, encoded and sent as the upper layer encoded image stream. The upper layer encoded image stream and the lower layer encoded stream are combined and sent over the communications channel. A decoder that receives the combined stream separates out the upper and lower encoded streams, decodes the lower stream, reproduces the non-linear processed stream and determines the which difference image stream was sent in the upper-layer encoded stream. Using the non-linear processed stream and the determined difference image stream along with any needed prediction frames, the upper-layer stream is reconstructed.

41 Claims, 16 Drawing Sheets

U.S. PATENT DOCUMENTS

| | | |
|---|---|---|
| 5,986,708 A | 11/1999 | Katata |
| 6,023,299 A | 2/2000 | Katata |
| 6,023,301 A | 2/2000 | Katata |
| 6,028,634 A | 2/2000 | Yamaguchi |
| 6,043,846 A | 3/2000 | Shen |
| 6,084,914 A | 7/2000 | Katata |
| 6,088,061 A | 7/2000 | Katata |
| 6,154,570 A * | 11/2000 | Boon .......................... 382/236 |
| 6,510,177 B1 * | 1/2003 | De Bonet et al. ....... 375/240.16 |
| 6,529,631 B1 * | 3/2003 | Peterson et al. ............ 382/232 |
| 6,532,263 B2 * | 3/2003 | Radha et al. ............ 375/240.1 |

* cited by examiner

METHOD AND SYSTEM FOR ENCODING AND DECODING MOVING AND STILL PICTURES

CROSS-REFERENCE TO RELATED APPLICATIONS

BACKGROUND

1. Field of the Invention

The present invention relates generally to video encoding and decoding for moving and still pictures and more specifically to multi-dimensional-scalable video compression and decompression of high resolution moving and still pictures.

2. Description of the Related Art

As high definition television begins to make its way into the market, the installed base of existing television systems and video storage systems that operate at reduced definition must not be ignored. To address the complex problem of different resolutions and standards several techniques are available. One of these techniques, scalable video coding, provides for two or more resolutions simultaneously in the video coding scheme to support both the installed base of standard resolution systems and new systems with higher resolution.

One scalable video coding technique is spatial scalability, which seeks to provide two or more coded bit streams that permit the transmission or storage of a lower resolution and a higher resolution image. One stream, a lower resolution encoded image stream, contains the lower resolution image data and the other stream, an encoded difference image stream, contains the data needed for forming a higher resolution image when combined with the lower resolution image. An encoded image stream is a time sequence of frame pictures or field pictures, some of which may be difference frames, that are encoded in accordance with a particular standard such as JPEG, MPEG-1, MPEG-2 or MPEG-4 or other similar standard. A source image stream is a time-ordered sequence of frame pictures or field pictures $F_1$–$F_n$, each containing a number of pixel blocks, that are presented to an encoder for coding or generated from a decoder for viewing.

FIG. 1 shows a standard MPEG-2 encoder 10, which is modified in FIG. 3 to become a spatial scalable codec. In FIG. 1, the standard encoder 10 has a first adder (subtractor) 12 that receives an input frame sequence $F_n$ and a predicted frame sequence $P'_n$ and forms the difference between the two, $(F_n-P'_n)$. A discrete cosine transform (DCT) coder 14 next transforms the difference $(F_n-P'_n)$ into the frequency domain to generate $(F_n-P'_n)_T$. A quantizer (Q) 16 receives the difference and quantizes the difference values to generate $(F_n-P'_n)_{TQ}$ and a variable length coder 18 (VLC) entropy encodes the result to create the output bit stream $(F_n-P'_n)_{TQE}$.

To generate a predicted frame sequence $P'_n$, a local decoder loop is used (where primed symbols indicate a decoded or reconstructed signal). The predicted frame $P'_n$ can be either a forward or a forward and backward predicted frame. The local decoder starts at an inverse quantizer (IQ) 20 which receives the $(F_n-P_n)_{TQ}$ to form a sequence of transformed difference frames $(F'_n-P'_n)_T$. An inverse DCT coder 22 receives the transformed difference frames $(F'_n-P'_n)_T$ and generates the original $(F'_n-P'_n)$ difference sequence following which a second adder 24 sums the original difference sequence $(F'_n-P'_n)$ with the predicted frame $P'_n$ causing the output of the adder to generate a reconstructed original frame sequence $F'_n$. A frame store (FS) captures the recovered frame sequence $F'_n$ and produces a delayed frame sequence $F'_{n-1}$. Motion Estimator (ME) block 28 receives the original frame sequence $F_n$ and the delayed frame sequence $F'_{n-1}$ from the local decoder loop and compares the two to estimate any motion or change between the frame sequences in the form of displaced blocks. ME generates a motion vector mVn which stores information about the displacement of blocks between $F'_n$ and $F'_{n-1}$. A motion compensation predictor (MCP) 30 receives the motion vectors and the delayed frame sequence $F'_{n-1}$ and generates the predicted frame $P'_n$ which completes the loop.

The encoding process starts without any initial prediction, i.e., $P'_n=0$, which permits the frame store FS 26 to develop a first stored frame $F'_n=F'_{n-1}$. On the next input frame, a prediction $P'_n$ is made by the MCP 30 and the encoder begins to generate encoded, quantized, transformed and motion compensated frame difference sequences.

FIG. 2 shows an MPEG-2 decoder 32. The decoder is similar to the local decoder loop of the encoder in FIG. 1. The encoded bit stream $(F_n-P'_n)_{TQE}$ and encoded motion vectors are decoded by the IVLC block 34. The motion vectors are sent directly from the IVLC block to the motion compensation prediction block (MCP) 36. The transformed and quantized image stream is then inverse quantized by the IQ block 38 and then transformed back to the time domain by the IDCT block 40 to create the reconstructed difference image stream $(F'_n-P'_n)$. To recover a representation of the original image stream $F'_n$, the predicted frames $P'_n$ must be added, in the summation block 42, to the recovered difference image stream. These predicted frames $P'_n$ are formed by applying the recovered motion vectors, in a motion compensation prediction block, to a frame store 44 which creates a $F'_{n-1}$ stream from the original image stream $F_n$. To get the decoder started, an image stream without $P'_n$ is decoded. This allows the frame store to obtain the $F'_n$ image and to store it for use in subsequent predictions.

FIG. 3 shows a prior art system 48 for encoding an image stream with spatial-scalable video coding. This system includes a spatial decimator 50 that receives the source image stream and generates a lower resolution image stream from the source image stream, a lower layer encoder 52 that receives the lower resolution image stream and encodes a bit stream for the lower layer using an encoder similar to that of FIG. 1, a spatial interpolator 54 that receives a decoded lower layer image stream from the lower layer encoder and generates a spatially interpolated image stream and an upper layer encoder 56, similar to that of FIG. 1, which receives the source image stream and the spatially interpolated image stream to generate the upper layer image stream. Finally, a multiplexor 58 is included to combine the lower and upper layer streams into a composite stream for subsequent transmission or storage.

The spatial decimator 50 reduces the spatial resolution of a source image stream to form the lower layer image stream. For example, if the source image stream is 1920 by 1080 luminance pixels, the spatial decimator may reduce the image to 720 by 480 luminance pixels. The lower layer encoder 52 then encodes the lower resolution image stream according to a specified standard such as MPEG-2, MPEG-4 or JPEG depending on whether motion or still pictures are being encoded. Internally, the lower layer encoder 52 also creates a decoded image stream and this image stream is sent to the spatial interpolator 54 which approximately reproduces the source video stream. Next, the upper layer encoder 56 encodes a bit stream based on the difference between source image stream and the spatially interpolated lower layer decoded image stream, or the difference between the source image stream and a motion compensated predicted image stream derived from the upper layer encoder or some weighted combination of the two. The goal is to choose either the motion compensated predicted frames or the spatially interpolated frames (or a weighted combination thereof) to produce a difference image stream that has the smallest error energy.

A spatial-scalable system, such as above, can offer both a standard television resolution of 720 by 480 pixels and a high definition resolution of 1920 by 1080 pixels. Also, scalability coding has other desirable characteristics such as interoperability of different video systems, improved World-Wide Web browser viewing of compressed images, and error-resiliency over noisy communication systems. However, scalability does not come without a cost compared to a single layer coding of the same image size. Typically, current image coding schemes, such as the scalable system described above, require a higher bit rate compared to single layer coding at the same picture quality, especially when interlaced pictures are involved. This higher bit rate tends to favor acceptance of single layer image coding.

Therefore, there is a need for a scalable image coding system and method that substantially reduces the bit rate of a multi-dimensional-scalable encoded image stream so that existing standard definition receivers can receive a standard quality image without incurring a cost at the receiver and high definition receivers can receive high quality images that are better than high definition images encoded as a single layer.

BRIEF SUMMARY OF THE INVENTION

The present invention is directed towards the above-mentioned need. A method for encoding a source image stream to produce a lower-layer encoded image stream and an upper-layer encoded image stream includes the following steps. First, a down-converted source image stream is generated and encoded to create the lower-layer encoded image stream. Next, the lower-layer encoded image stream is decoded and then up-converted. The up-converted image stream is then processed in a non-linear fashion to generate a non-linear processed image stream. Next, a plurality of upper-layer difference streams is formed based on the source image stream and the non-linear processed image stream and an upper-layer difference stream is selecting for encoding. Finally, the selected upper-layer difference stream is encoded to form the upper-layer encoded image stream. In one embodiment the upper-layer difference stream includes a motion-compensated difference stream. This motion compensated difference stream is derived from prediction frames that may include.

A method, in accordance with the present invention, for decoding a layered, encoded image stream to produce a lower-layer image stream and an upper-layer image stream includes the following steps. First, the layered encoded image stream is de-multiplexed into a upper-layer encoded image stream and a lower-layer encoded image stream. The lower-layer encoded image stream is decoded to provide a lower-layer image stream which is then up-converted and processed to form a non-linear processed image stream. The composition of the upper-layer encoded image stream is then determined and the upper-layer encoded image stream is decoded to provide the upper-layer image stream based on the determined composition of the encoded upper-layer image stream, at least one composition of the encoded upper-layer image stream requiring the non-linear processed image stream to decode the upper-layer encoded image stream.

This approach has all the merits of spatial scalability coding algorithms such as interoperability, easy database browsing and indexing and error-resiliency. An advantage of the present invention is that a smaller bandwidth is required to send the lower layer encoded image stream and the upper-layer encoded image stream compared to current coders or, equivalently, higher quality images can be sent for a given bandwidth compared to current coders using the same bandwidth.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 4:
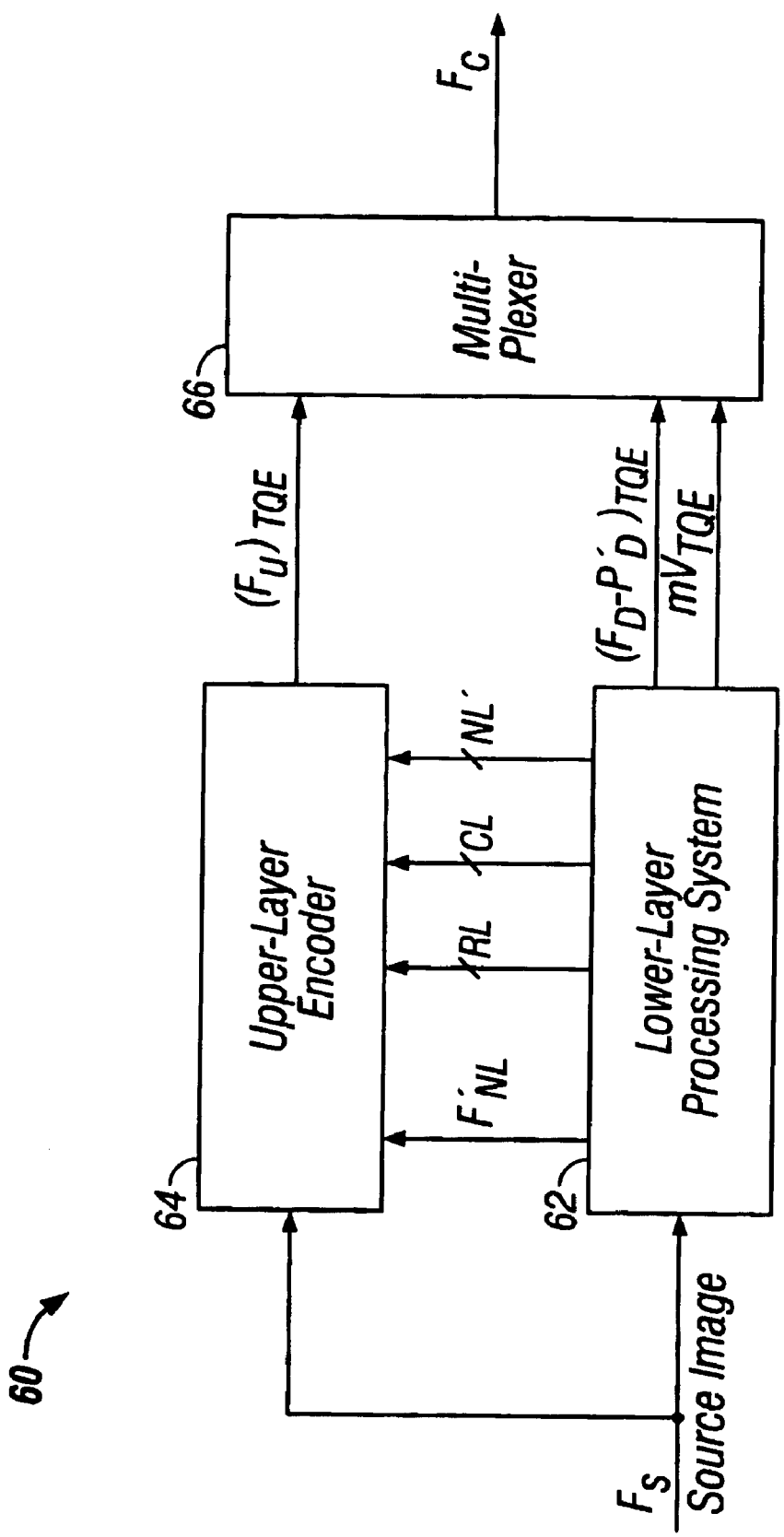
FIG. 4 shows a block diagram of a system for multi-dimensional encoding a video stream into a lower and an upper layer in accordance with the present invention.

FIG. 4 shows a block diagram of a system for multi-dimensional encoding a video stream into a lower and an upper layer in accordance with the present invention. The lower-layer processing system 62 receives the source image $F_S$ stream and generates an encoded output stream $(F_D-P'_D)_{TQE}$, where $F_D$ represents a down converted image stream and $P'_D$ is a predicted down-converted image stream and the subscript 'TQE' means that the stream is Transformed, Quantized, and entropy Encoded in accordance with a given standard such as JPEG or MPEG. In this case the difference between the down converted stream and its prediction is transformed, quantized and encoded. The predicted down-converted image stream comprises any kind of predicted frames, including a P frame or B frame as in MPEG-2, that the receiver (decoder) can re-create from a previously decoded frame and a motion vector, which is included in the encoded output stream.

In the course of processing in the lower-layer, the lower layer generates a re-constructed frame sequence $F'_{NL}$ and a number of indicators, RL, CL, NL', which are used by the upper-layer encoder. Indicator RL is a resolution loss indicator, indicator CL is a compression lost indicator, and indicator NL' is a non-linear processing indicator.

The upper-layer encoder 64 receives the re-constructed frame sequence $F'_{NL}$ and the indicators, RL, CL, NL', along with the source image $F_S$ and creates the encoded upper layer encoded output stream $(F_U)_{TQE}$.

Multiplexer 66 servers to combine the upper layer encoded image stream and the lower layer encoded image stream into a layer encoded image stream $F_C$.

Figure 5:
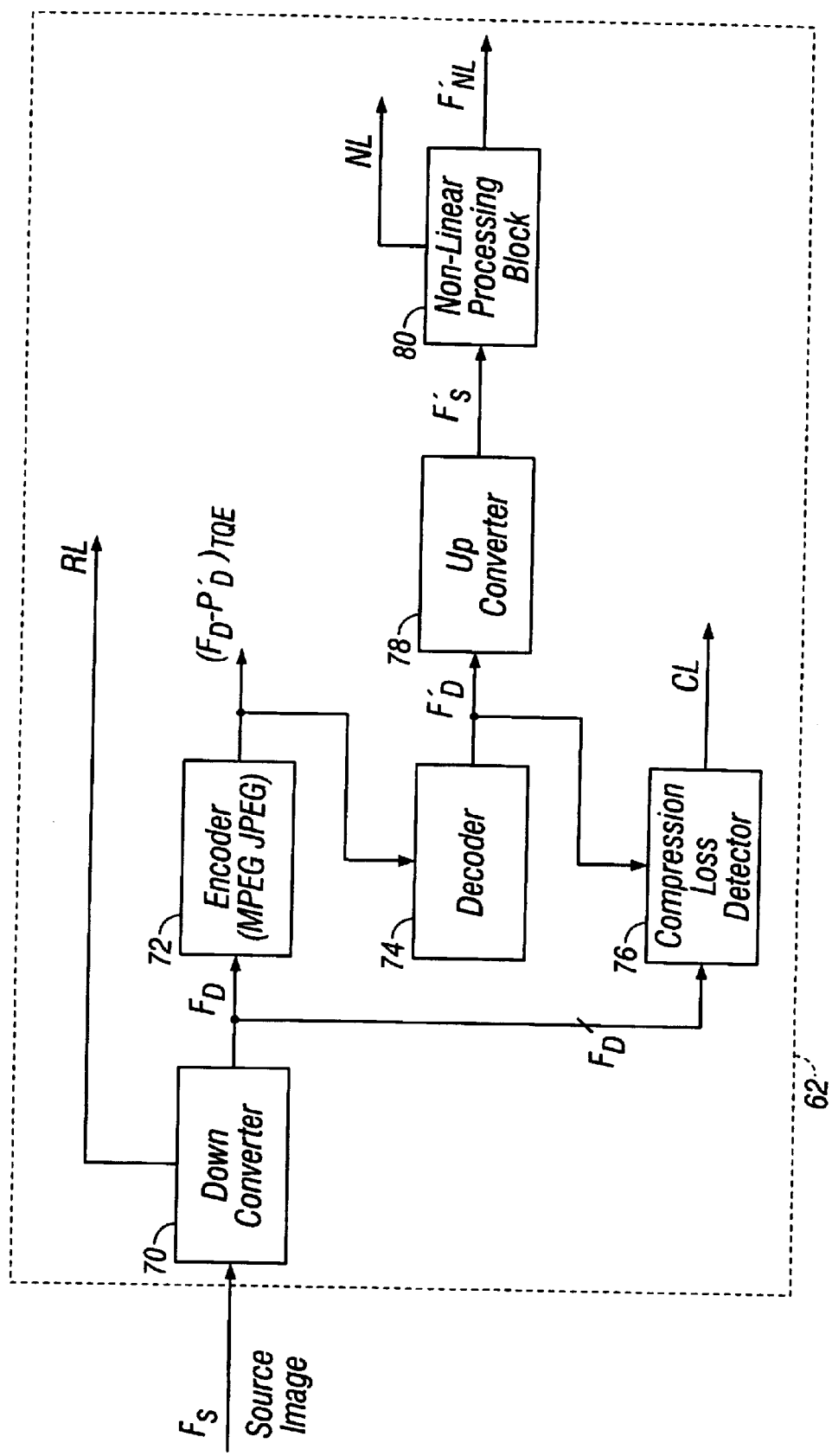
FIG. 5 shows the lower layer encoding system of the present invention.

FIG. 5 shows a block diagram of the lower layer encoding system 62 of the present invention. The system includes a down converter 70 that creates a lower resolution image stream $F_D$ and the resolution loss indicator RL, an encoder 72 that encodes the lower-resolution image to produce the lower layer output stream, $(F_D-P'_D)_{TQE}$, a decoder 74 that reconstructs the lower-layer output stream to produce $F'_D$, a compression lost detector 76 that generates the CL signal, an up-converter 78 for re-creating an original resolution image $F'_S$ from the $F'_D$ stream; and a non-linear processing block 80 that generates, from the $F'_S$ stream, an up-converted, non-linear processed stream $F'_{NL}$ along with the non-linear processing indicator NL'.

Figure 1:
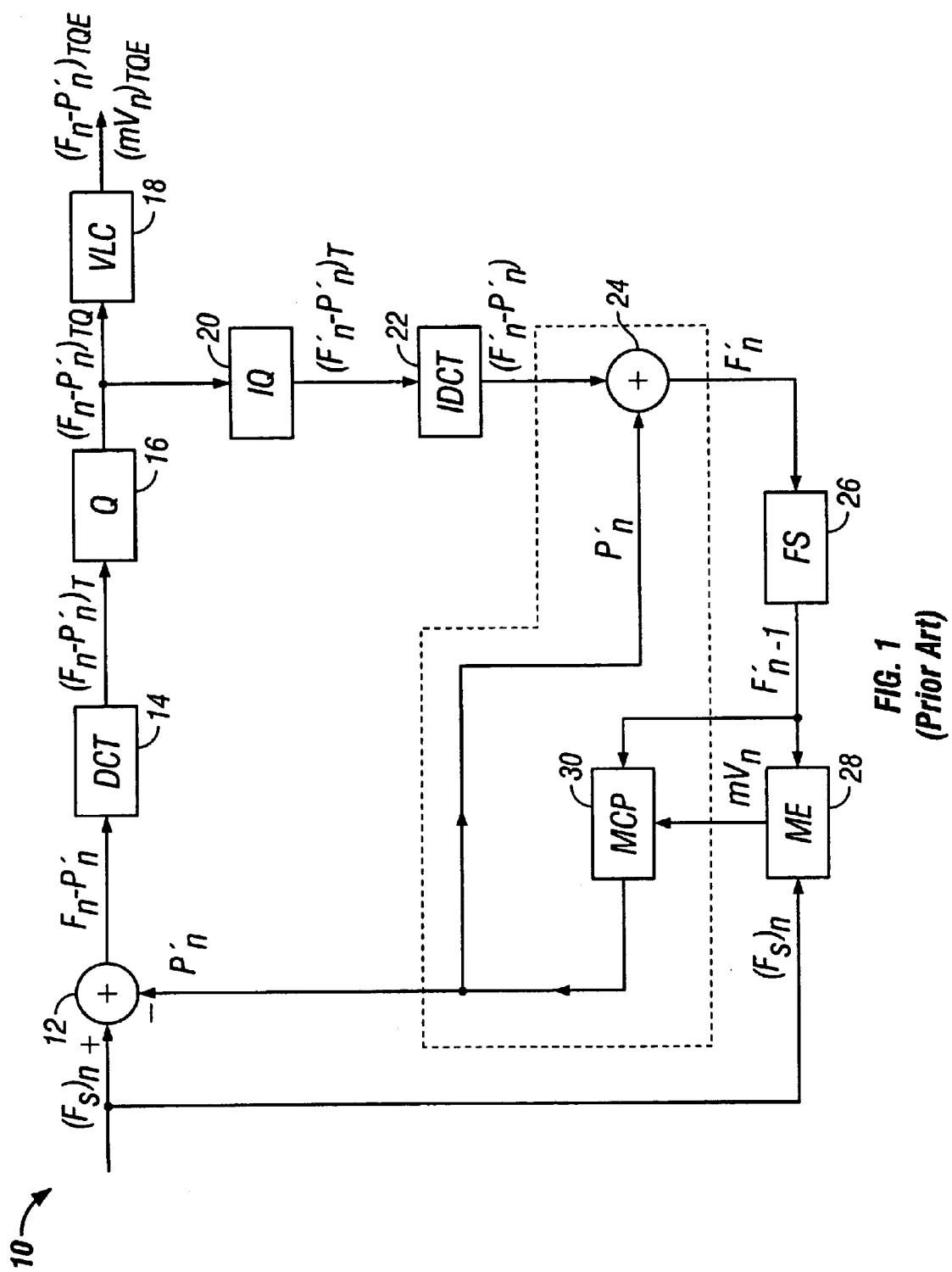
FIG. 1 shows a prior art MPEG-2 encoder.
Figure 2:
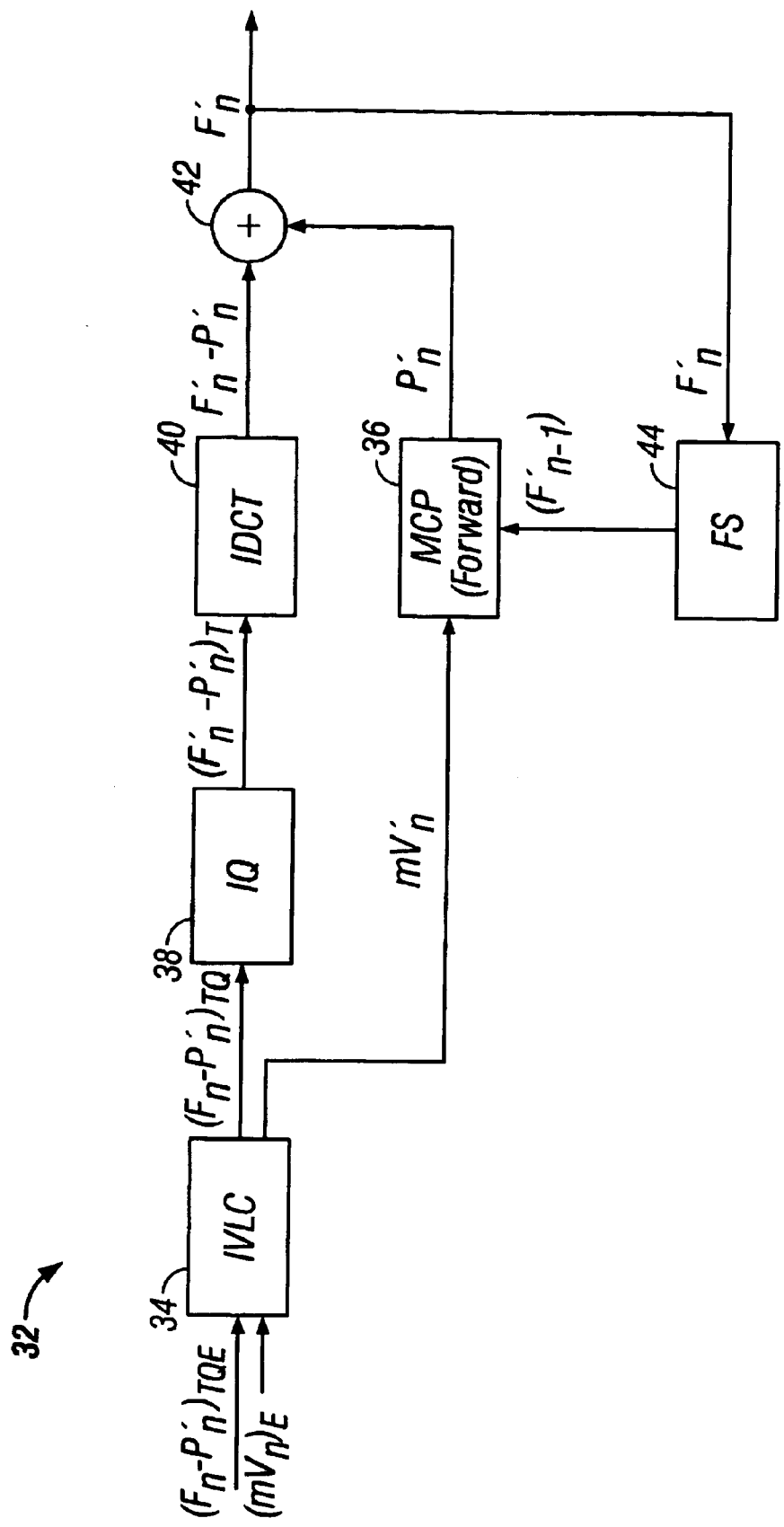
FIG. 2 shows a prior art MPEG-2 decoder.
Figure 3:
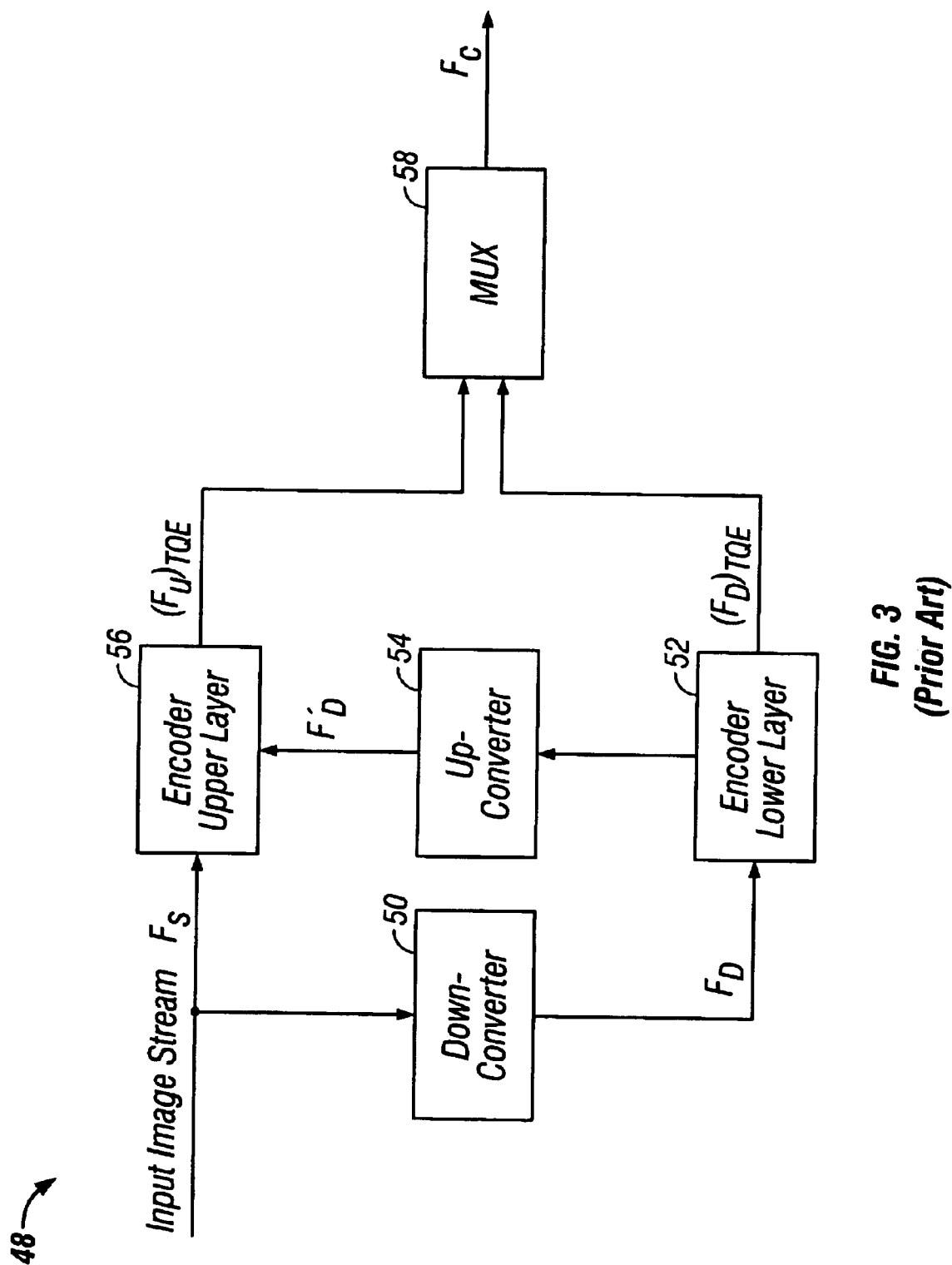
FIG. 3 shows a prior art system for encoding a video stream with spatially-scalable video coding.

Source images $F_S$ received by the lower layer system are multi-dimensionally decimated by the down-converter 70 and then encoded to become the lower resolution output stream $(F_D-P'_D)_{TQE}$. The encoder 72 is any standard encoder such the MPEG encoder shown in FIG. 1. The encoded stream is then received by the decoder 74 and the reconstructed down-converted image stream $F'_D$ is created. The decoder 74 can be any decoder that reverses the encoding process of the encoder, such as the decoder shown in FIG. 2. The compression loss indicator block 76 receives both the down-converted stream $F_D$ and the re-constructed, down converted stream $F'_D$ to determine where the encoding differences exist between the two streams. At the position of the differences, the gating signal CL becomes active to indicate where compression-decompression losses have occurred in the encoding of the down converted image stream. Gating signal CL is used in the upper-layer processing as described below.

The decoded down-converted image $F'_D$ is multi-dimensionally-interpolated by the up-converter 78 to create a stream $F'_S$ having the same resolution as the original stream $F_S$. Finally, a non-linear processing block 80 operates on the reconstructed image $F'_S$ to improve the quality of the image. This improved image stream is used in the upper-layer processing to reduce the bit rate of the upper-layer.

Figure 6:
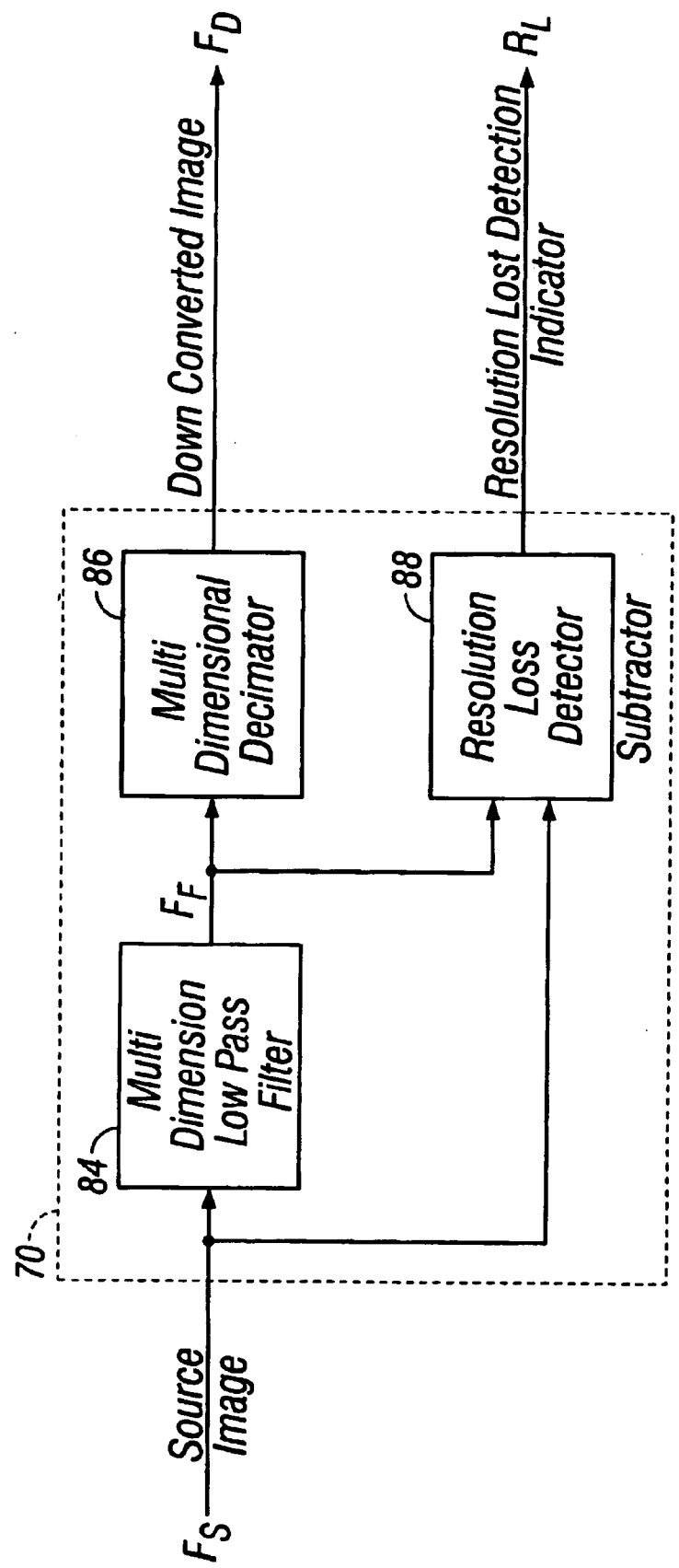
FIG. 6 shows the down converter of the lower layer of FIG. 5.

FIG. 6 shows the down converter 70 of the lower layer of FIG. 5. The down converter includes a multi-dimensional low pass filter 84 that receives the source image stream $F_S$ and creates a filtered image $F_F$ to reduce aliasing artifacts that would otherwise result from the sub-sampling function carried out by the multi-dimensional decimator block 86. This latter block 86 receives the filtered image $F_F$ and produces the down-converted image $F_D$ by sub-sampling the filtered image. The down-converter 70 also has a resolution loss detector block 88 for determining where resolution is lost in the down-conversion process by comparing the source image $F_S$ to the filtered image $F_F$ and so indicating on a pixel-by-pixel basis with the $R_L$ signal.

Figure 7:
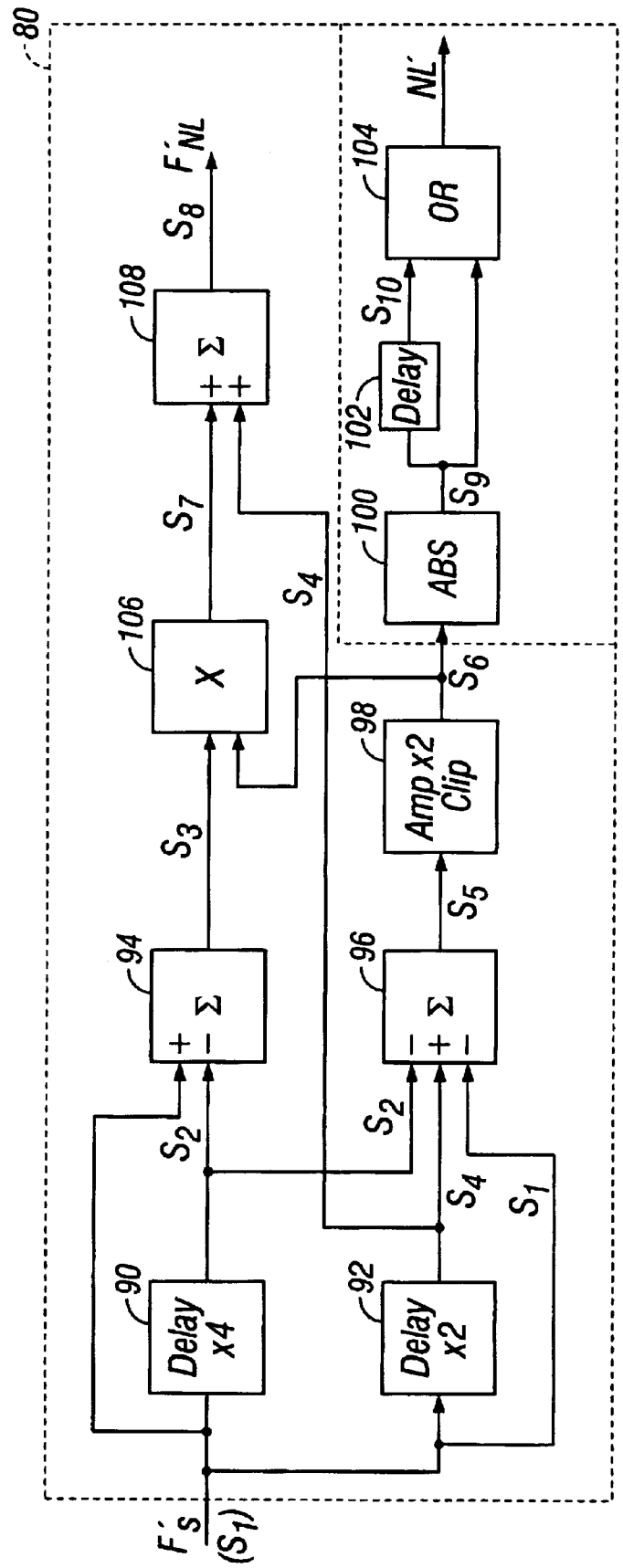
FIG. 7 shows a block diagram of the non-linear processing block of the lower layer of FIG. 5.

FIG. 7 shows the non-linear processing block 80 of the lower layer of FIG. 5. The function of this block is to generate an improved image from the up-converted image $F'_n$, which is a multi-dimensional-interpolated version of the decoded, down-converted image $F'_D$ as shown in FIG. 5. The non-linear processing block includes a first delay 90 and a second delay 92, each of which is connected to receive the up-converted image $F'_S$, a first adder 94 which combines the up-converted image signal $F'_S$(S1) with the first delay output S2 to form a first differential signal S3, and a second adder 96 which combines the up-converted image signal $F'_S$(S1) with the first delay output S2 and the second delay output S4 to form a second differential signal S5. Following the second adder 96 is an amplifier and clipping block 98 generating output S6, an absolute value block 100 with output S9 and a third delay 102 with output S10 and a third adder block 104. The third adder block 104 and the third delay block 102 are connected to receive the output of the absolute value block S9. The output of the third adder 104 (which is implemented as an 'OR' gate) is the non-linear processing indicator NL', which indicates on a pixel-by-pixel basis where-in the image the non-linear processing has occurred.

Also included in the non-linear processing block are a multiplier 106 that multiplies the outputs of the first adder 94 and the amplifier and clipping block 98 and a fourth adder 108 that sums the output of the multiplier 106 with the output of the second delay 92. The output of the fourth adder 108 is the up-converted non-linear processed image stream $F'_{NL}$.

Figure 8:
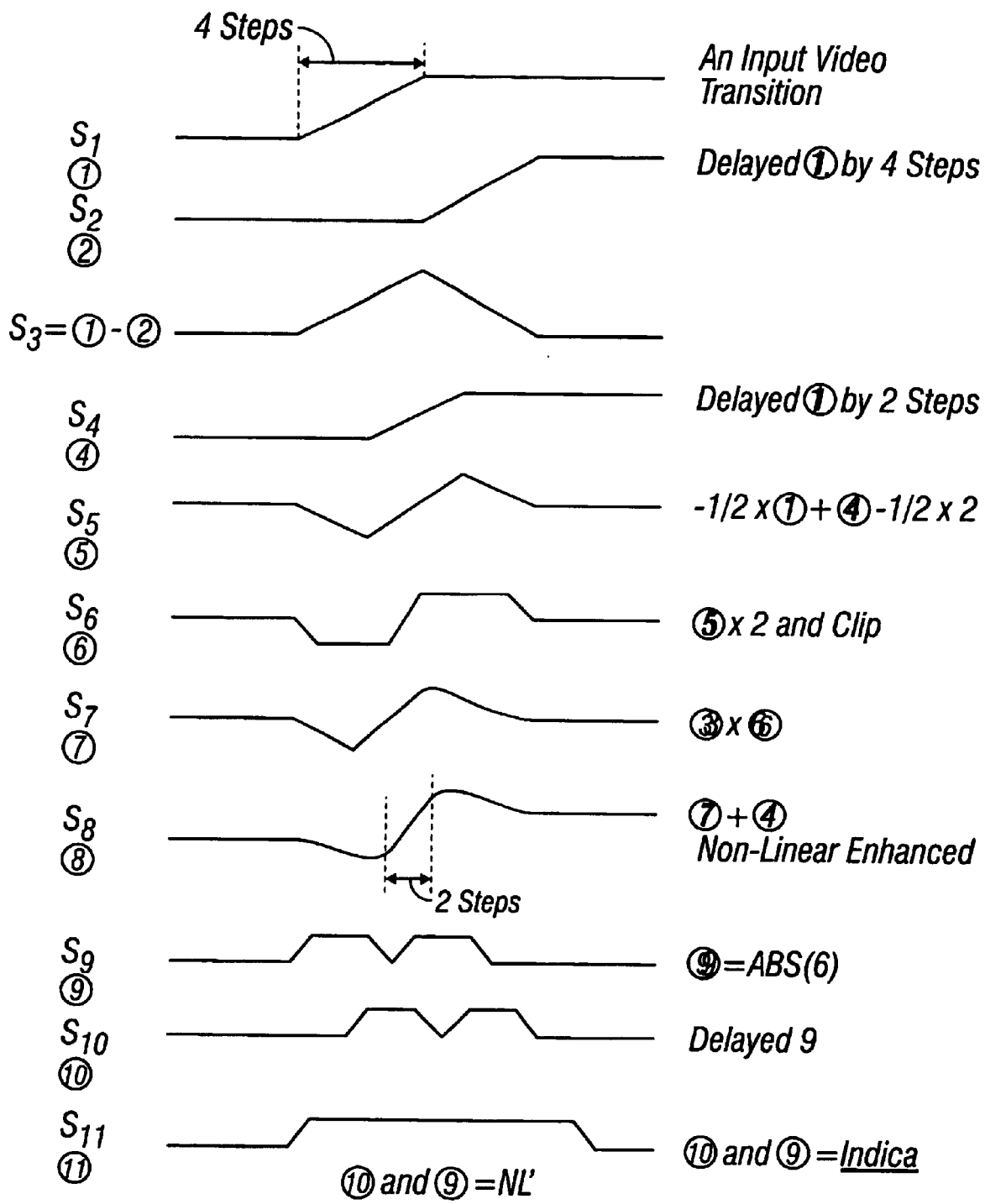
FIG. 8 shows the various waveforms involved in the non-linear processing block shown in FIG. 7.

Referring to FIG. 8, the non-linear processing block operates to modify the slope of a transition of an input signal. The first delay 90 and the second delay 92 operate to delay a transition of an input signal by four steps S2 and two steps S4, respectively. The first adder 94, which combines the input S1 and first delay output S2, forms a first differential signal S3 which is a pulse with rise and fall times approximately equal to the original transition time of the input signal S1. The second adder 96, which combines the original input S1 with the second delay output S4 and the first delay output S2, forms a second differential signal S5 which includes a positive pulse and a negative pulse. The negative pulse is related to the beginning of the transition of the input signal and the positive pulse is related to the end of the transition of the input signal. Next, the output of the second adder S5 is shaped by the amplifier and clipper block 98 to form a double pulse signal S6 having flattened portions and improved transition times. The absolute value of the clipped pulse then creates a double pulse signal S9 in which both pulses have the same direction (shown are two positive pulses.) This double pulse signal is then delayed to produce another double pulse S10 which is added ('OR'ed) with the original one S9 to form a gating signal NL' in the proximity of the transition of the input signal.

Additionally, the outputs S3, S6 of the first adder 94 and amplifier and clipping block 98 are multiplied to form a second double pulse signal S7 with a positive and negative pulse. The second double pulse signal is then summed with the output S4 of the second delay 92 to produce an improved output signal $F'_{NL}$ that has a faster transition than the input signal S1. In one embodiment, the transition of the enhanced output signal is twice as fast as the transition of the input signal and delayed two steps.

Figure 9A:
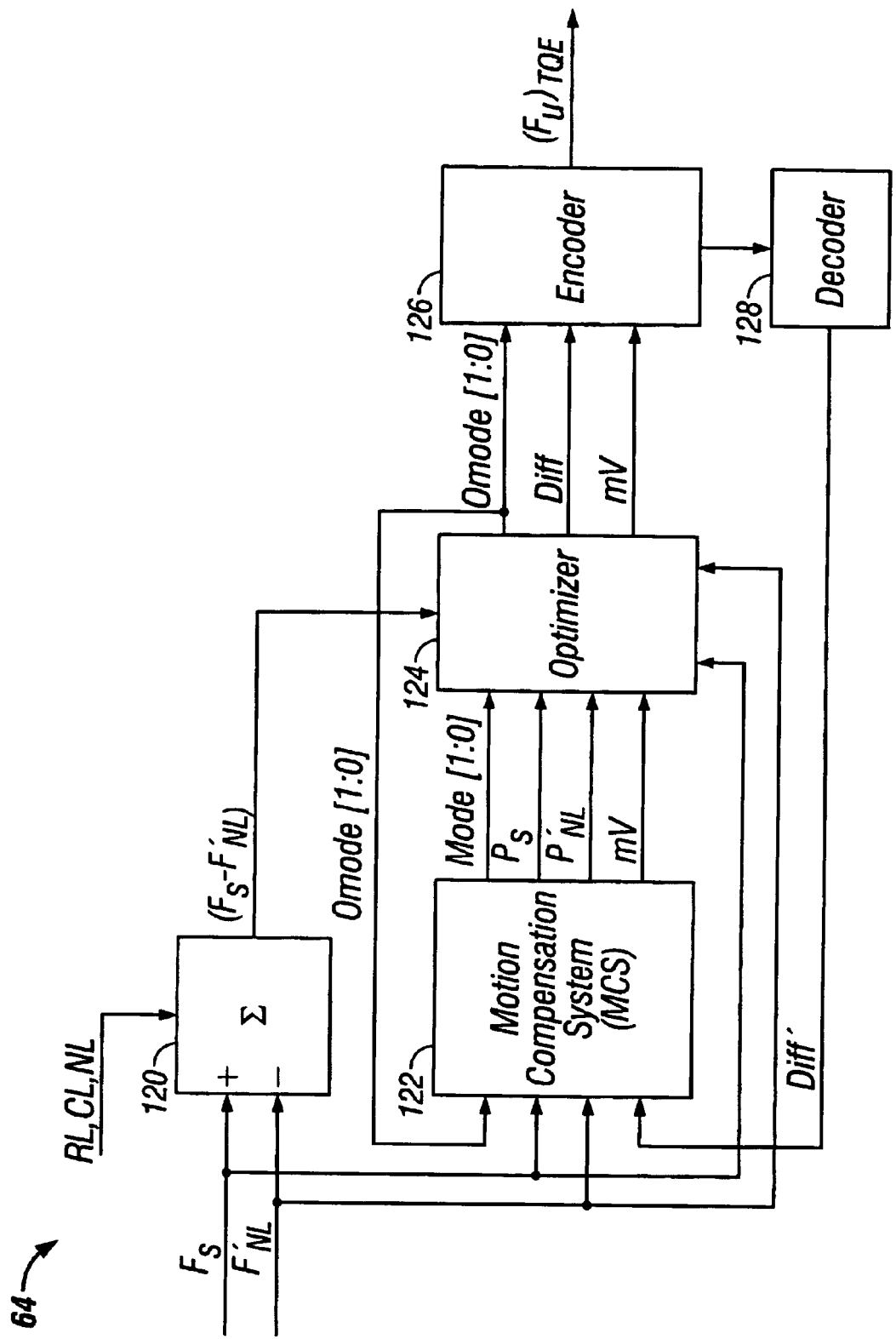
FIG. 9A shows a block diagram of the upper layer encoding system of the present invention.

FIG. 9A shows a block diagram of the upper layer encoding system 64 of the present invention. The upper layer encoding system includes a summation block 120, a motion compensation system 122, and an optimizer 124, each of which receives both the source image $F_S$ and the non-linear processed up-converted image $F'_{NL}$ streams. The outputs of the optimizer, omode[1:0], diff and mV, feed an entropy encoder 126 which generates the upstream encoded stream $(F_U)_{TQE}$. A decoder 128 is connected to the entropy encoder to create a reconstructed diff signal that is used in the motion compensation system 122. This decoder 128 reverses the encoding performed by the entropy encoder.

The summation block 120 is additionally connected to the several gating signals, i.e., the resolution loss indicator $R_L$, the compression lost indicator CL and the non-linear processing indicator NL' to generate a difference image stream $(F_S-F'_{NL})$ to which the gating signals have been applied to minimize the bit rate of the difference signal or possibly eliminate the difference signal. The resolution loss RL indicator is used to determine when the difference signal needs to transmitted by the upper-layer encoder. In particular, if the RL indicator and the NL' indicator overlap (that is, they occur at the same time), the difference signal is suppressed, because the decoder (receiver) can regenerate an improved image at that location in the image. If the RL indicator and the NL' indicator do not overlap, then a difference signal is encoded to send additional resolution information through the communications channel to the decoder (receiver). The CL indicator indicates pixel locations in the image where differences caused by the lower-layer compression processing are such as to suppress visual information the viewer is unable to see. Places in the image where compression loss occurs are optionally included in the difference signal of the upper layer only if there is enough channel bandwidth to send the information.

The motion compensation system 122 receives the source stream $F_S$, the up-converted and non-linear processed image stream $F'_{NL}$, the difference stream diff and the omode[1:0] signal. For the encoder, the motion vectors are generated by comparing the original source frame $F_S$ or non-linear processed, up-converted image stream $F'_{NL}$ (or both) with the previously decoded, reconstructed images $F'_R$ that are derived from the decoded diff signal and the omode[1:0] signal from the optimizer or up-converted and non-linear processed images. The prediction frames are generated by using the motion vectors from the motion estimation block and previously decoded, reconstructed images $F'_R$. If a motion vector is derived from original frame $F_S$, this motion vector may need to be transmitted to the receiver to start the decoding process. If a motion vector is derived from the non-linear processed, up-converted image stream $F'_{NL}$, this motion vector need not be transmitted to the decoder because the decoder along can derive the required motion vectors for the up-converted image stream $F'_{NL}$.

The optimizer 124 receives the motion vectors, the output of the summation block 120 $(F_S-F'_{NL})$, the mode signals, the prediction outputs, in addition to the source frames $F_S$ and up-converted frames $F'_{NL}$. The optimizer 124 determines the smallest difference signal diff that should be sent to the encoder 126, along with any motion vectors mV and mode signals omode[1:0] that may need to be encoded and transmitted to the receiver (decoder) in addition to the difference signal.

Figure 9B:
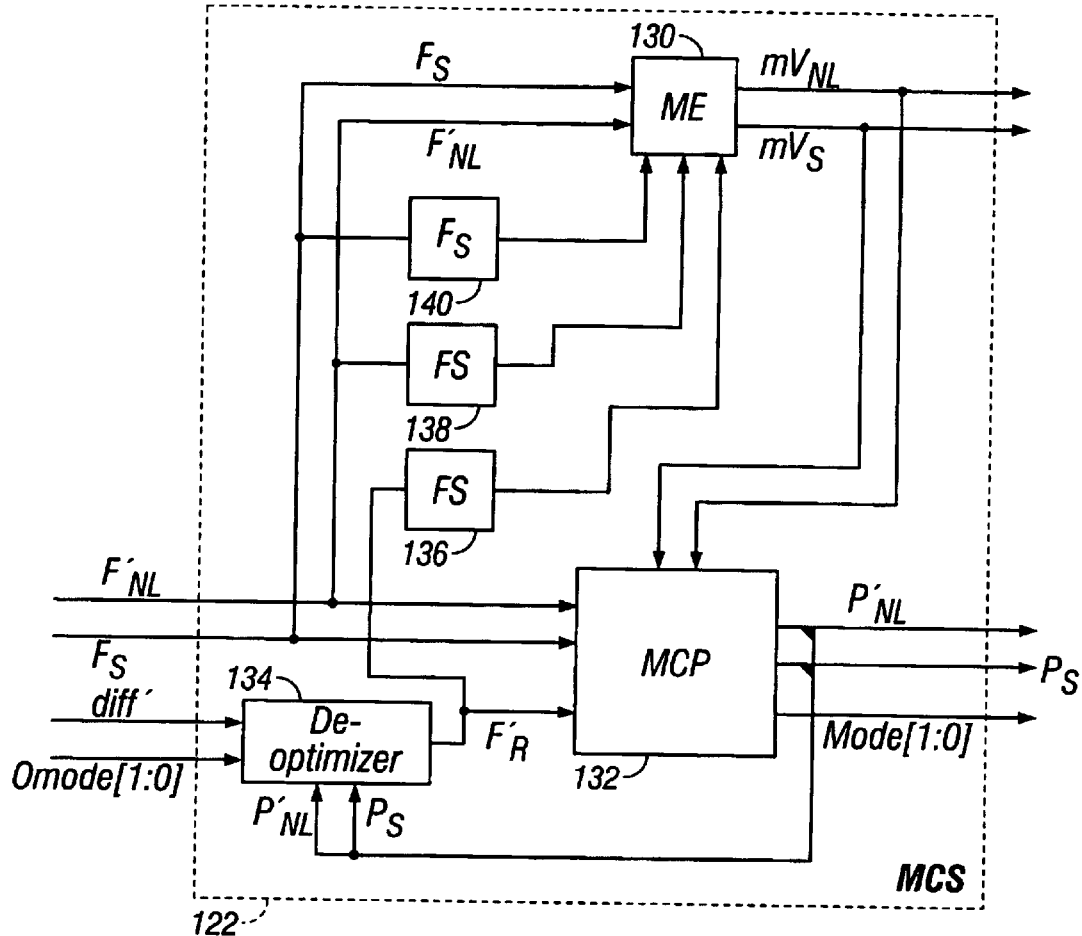
FIG. 9B shows a block diagram of the motion compensation system of FIG. 9A.

FIG. 9B shows a block diagram of the motion compensation block 122. Included are a motion estimator (ME) 130, a motion compensation prediction (MCP) block 132, a de-optimizer 134 and one or more frame stores (FS) 136, 138, 140. The motion estimator 130 receives the source image stream $F_S$, previously decoded and reconstructed images $F'_R$, and the non-linear processed image stream $F'_{NL}$ which are stored in a frame stores 140, 138, 136 respectively. The motion estimator 130 compares a frame in the frame store with a current frame to determine changes between the frames (or blocks of the frames). For the encoder, this comparison is between source frames $F_S$ or frames of the non-linear processed, up-converted image $F'_{NL}$ and frames of previously decoded and reconstructed images $F'_R$. For the decoder, the motion vectors are either received from the bit stream or derived from the non-linear processed, up-converted frame streams $F'_{NL}$, and previously decoded frame streams. Using the motion vectors and previously decoded and reconstructed image $F'_R$, the motion compensation prediction (MCP) block 132 forms a prediction frame (or block). Prediction frames (or blocks) can be either forward, backward or bidirectionally predicted frames (or blocks). The MCP block 132 also produces a mode signal mode[1:0] that indicates the type of prediction frame (or block) that is generated by the MCP block 132.

The de-optimizer 134 receives the reconstructed difference signal diff' the omode[1:0] signal and the prediction frames $P_S$ and $P'_{NL}$. With the omode[1:0] the de-optimizer 134 determines the composition of the difference signal diff and sums the proper prediction frame $P_S$ or $P'_{NL}$ with the diff signal to reconstruct the encoded frame $F'_R$.

Figure 10:
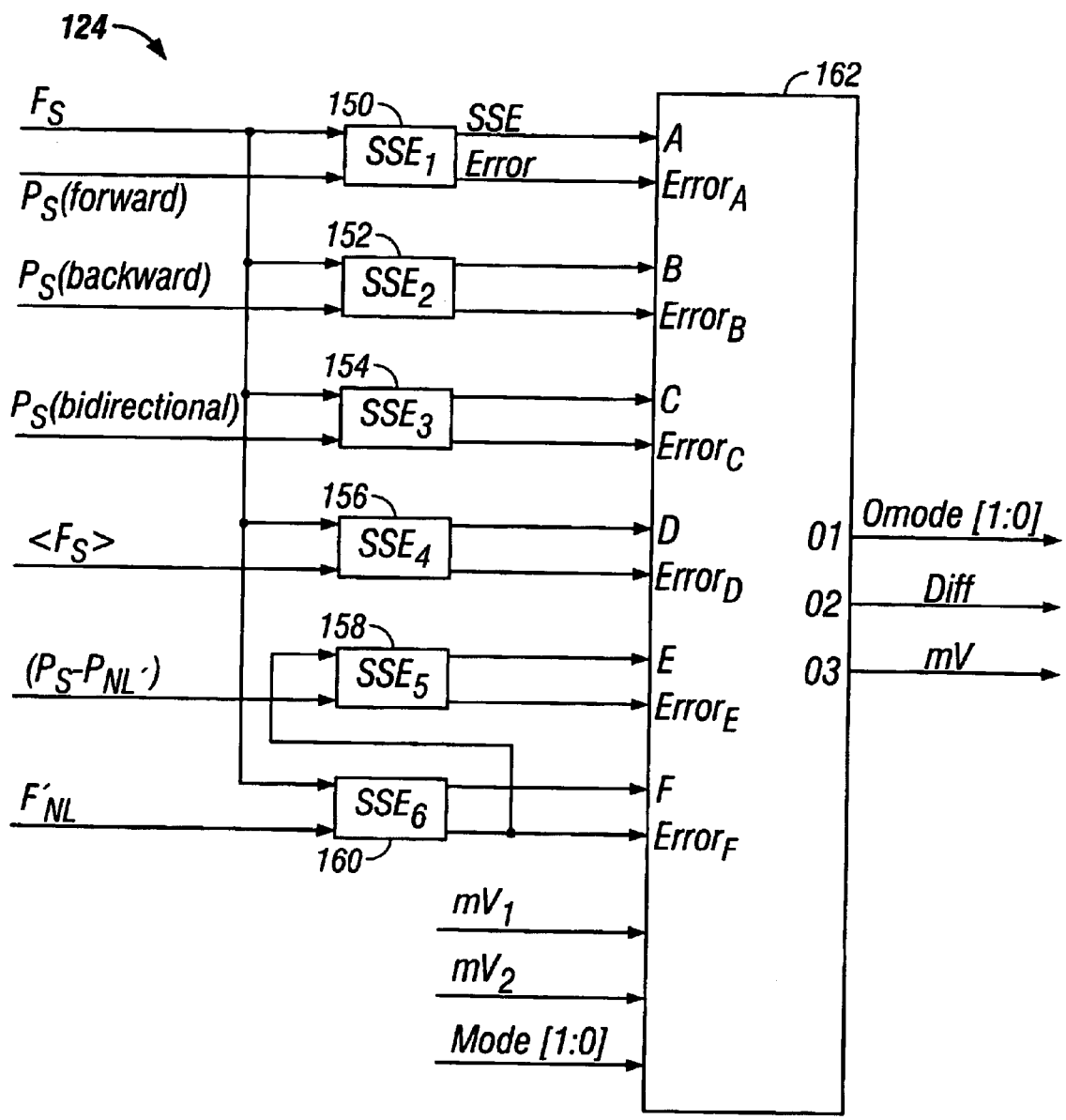
FIG. 10 shows a block diagram of the optimizer of the present invention.
Figure 11:
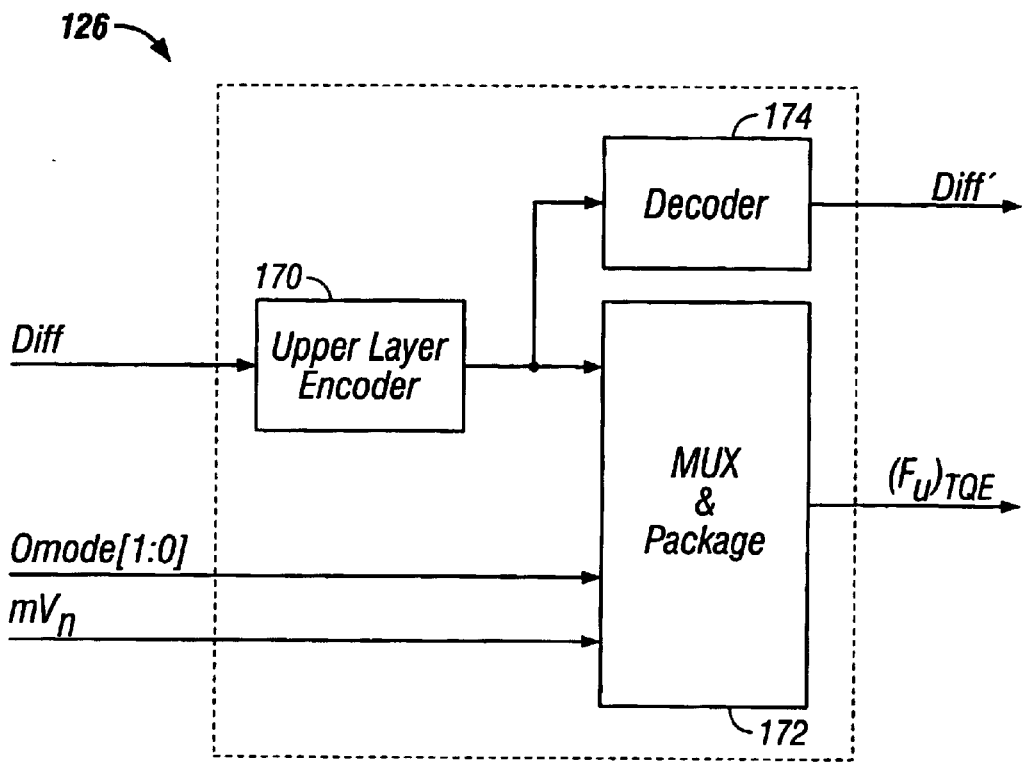
FIG. 11 shows a block diagram of the entropy encoder of the upper layer encoder of FIG. 9.

A block diagram of the optimizer 162 is shown in FIG. 10. The optimizer 162 includes a number of SSE (Sum of the Squared Error) blocks 150–160 and a comparator and selection block 162. An SSE block 150–160 computes the difference between a pair of signals on its inputs and also the sum of the square of those differences. Each SSE block has two inputs on which it operates and two outputs, one for carrying a signal representing the difference between the two inputs and the other for carrying a signal representing the sum of the squared differences between the two inputs.

A first SSE block 150 computes the differences and the sum of the squared differences between the source frame $F_S$ and a forward predicted frame $P'_S$ ($F_S-P'_S$) (e.g., a P-frame in MPEG-2)

A second SSE block 152 computes the differences between the source frame $F_S$ a backward predicted frame $P_S$ ($F_S-P'_S$).

A third SSE block 154 computes the differences between the source frame $F_S$ and a forward-and-backward predicted frame $P_S$ ($F_S-P'_S$) (e.g., a B-frame in MPEG-2).

A fourth SSE block 156 computes the differences between the source frame $F_S$ and a mean value of the source stream, that is, it computes an intra-frame difference ($F_S-<F_S>$).

A fifth SSE block 158 computes the differences between the source frame and the up-converted, non-linear processed difference image stream ($F_S-F'_{NL}$) and the latter as a predicted stream to generate a motion compensated difference image stream (($F_S-F'_{NL}$))–($P_S-P'_{NL}$)).

A sixth SSE block 160 computes the differences between the source frame $F_S$ and the up-converted non-linear processed stream, ($F_S-F'_{NL}$).

The comparator and selector block 162 compares the outputs of the various SSE blocks and selects the difference signal from the block with the smallest SSE along with any mode signals and motion vectors that are required to be encoded based on the selection. Motion vectors mV and mode signals omode[1:0] are required if the receiver (decoder) needs the motion vectors and mode signals to reconstruct the source image $F_S$ from the difference signal that is encoded by the upper level encoder. If the difference signal involves predictions of $F'_{NL}$, then motion vectors need not be sent because they can be derived at the decoder (receiver).

The entropy encoder 126 of FIG. 9A receives the selection diff from the optimizer 162 along with needed motion vectors and mode signals omode[1:0], all of which, if present, are encoded to further minimize the bit rate in the encoded output bit stream $(F_U)_{TQE}$, where $_{TQE}$ represents a transformed, quantized, and encoded bit stream.

The entropy encoder 126 includes an encoder 170, which receives the signal to be encoded, a multiplexer 172 for combining the encoded outputs with the motion vectors and mode signals and a decoder 174 for generating the reconstructed difference signal diff for use in the motion compensation system block of FIG. 9A.

Figure 12A:
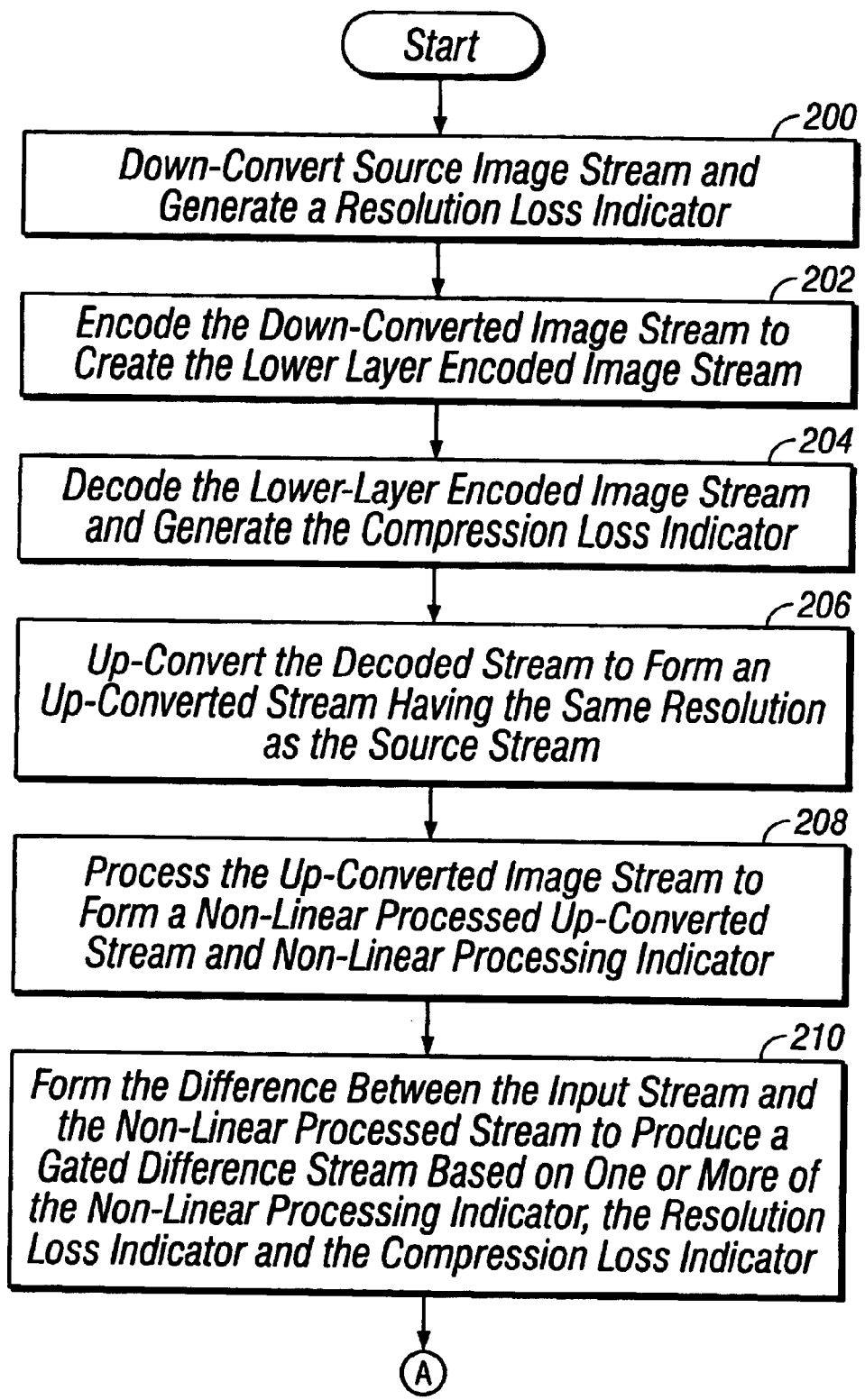
FIGS. 12A and 12B show a flow chart of the coding process in accordance with the present invention.
Figure 12B:
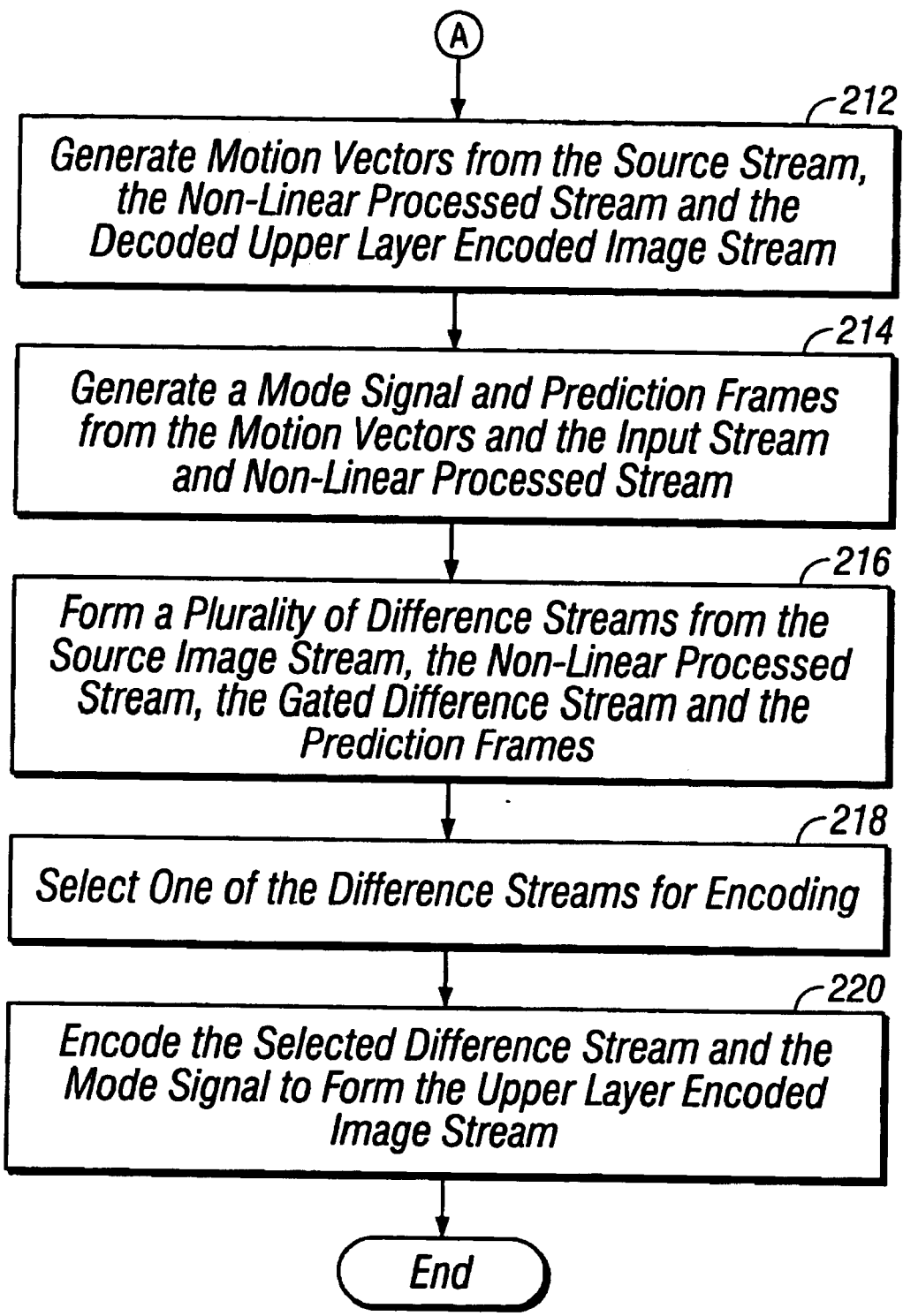

FIGS. 12A and 12B show a flow chart of the encoding process in accordance with the present invention. In step 200, the source image stream is down-converted to a resolution that is less than the source image stream. Down-conversion is performed by multi-dimensional filtering and multi-dimensional decimation. In step 202, the down-converted image is encoded to create the lower layer encoded image stream. Encoding is performed in accordance with standards such as MPEG-2, MPEG-4 or JPEG or similar standard. In step 204, the lower-layer encoded image stream is decoded and, in step 206, is up-converted by multi-dimensional interpolation to created a reconstructed source image stream $F'_S$, just as a receiver (decoder) would. Next, the up-converted image stream is non-linearly processed, in step 208, to improve the up-converted image, and in step 210, the gated difference stream is formed between the input stream and the non-linear processed image stream based on one or more of the non-linear processing indicator, the resolution loss indicator and the compression loss indicator. In step 212, motion vectors are obtained either from the source stream $F'_S$ or derived from the up-converted and non-linear processed images $F'_{NL}$ using the decoded upper layer encoded image stream. Next, a mode signal and prediction frames derived from the motion vectors, the input stream and the non-linear processed stream are generated in step 214.

Then, in step 216, an optimizer then computes a number of difference image streams between the source image stream, the non-linearly processed stream, the gated difference image stream and the prediction frames for these streams. In step 218 one of the difference image streams is selected, the one selected being one with the lowest sum of the squared differences between a pair of streams. In step 220, the selected difference image stream is encoded along with the mode signal to form the upper layer encoded image stream. The upper layer encoded image stream and the lower layer image stream are combined to form a layered, encoded image stream.

Figure 13:
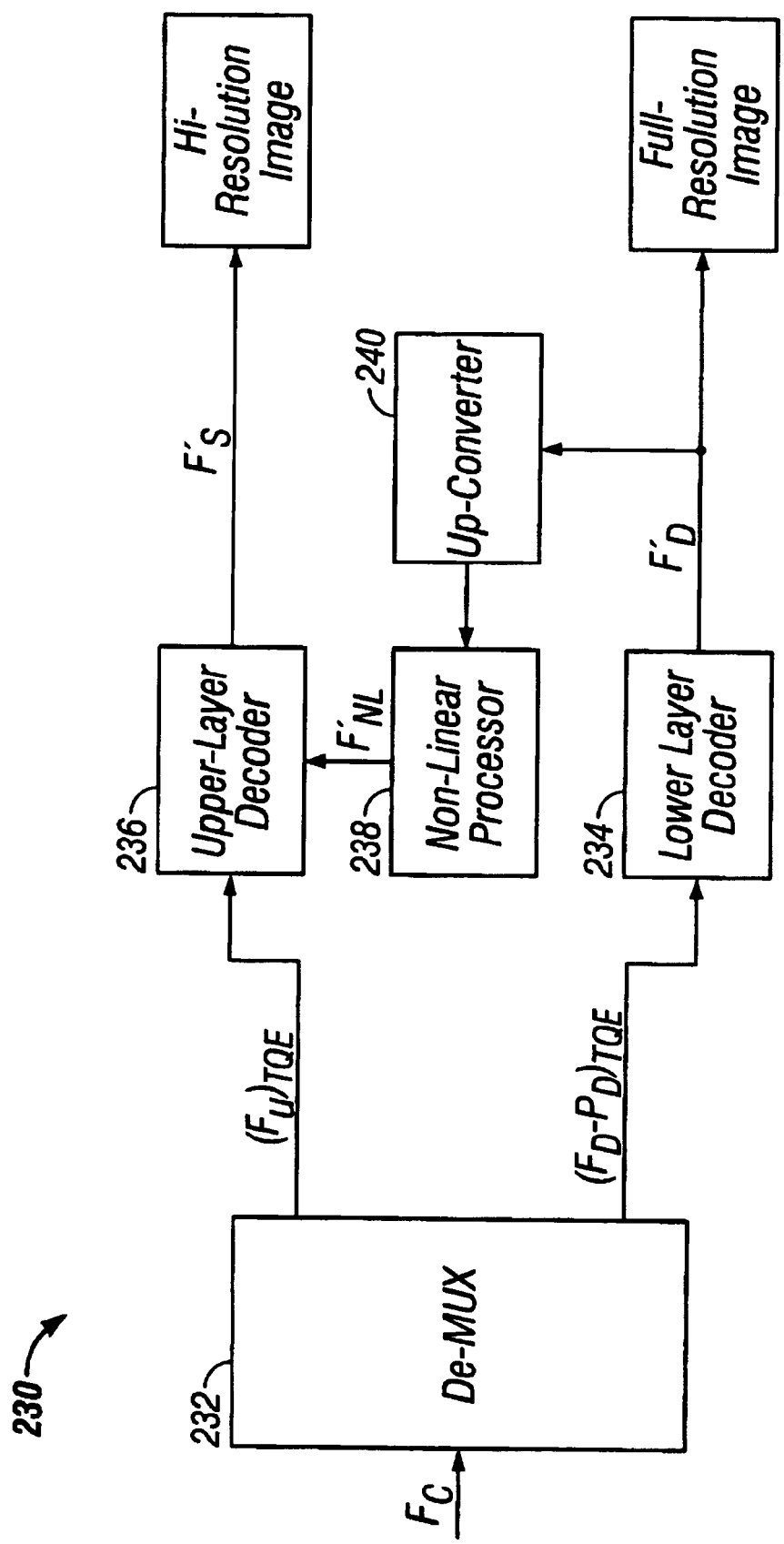
FIG. 13 shows a block diagram of a full decoder of the present invention.

FIG. 13 shows a block diagram of the upper and lower layer decoder 230 in accordance with the present invention. The combined and encoded image stream $F_C$ is de-multiplexed by de-multiplexer 232 into the upper layer encoded stream $(F_U)_{TQE}$ and the lower layer encoded stream $(F_D-P_D)_{TQE}$ (assuming that the customary motion compensation prediction is used by the lower layer encoder). The lower layer encoder 234 reconstructs the lower layer stream $F'_D$ using customary decoding techniques such as those shown in FIG. 2. The $F'_D$ stream is then processed by the non-linear processor block to create the $F'_{NL}$ stream which is approximately the same stream as that shown in FIG. 5.

The upper layer decoder 236 receives both the up-converted, non-linear processed stream $F'_{NL}$ from non-linear processor 238 and up-converter 240 and the upper layer encoded stream $(F_U)_{TQE}$ and generates as its output the reconstructed high-resolution image stream $F'_S$. The result is that both the full-resolution image stream $F'_D$ and the high-resolution image stream are both available from the decoder.

Figure 14:
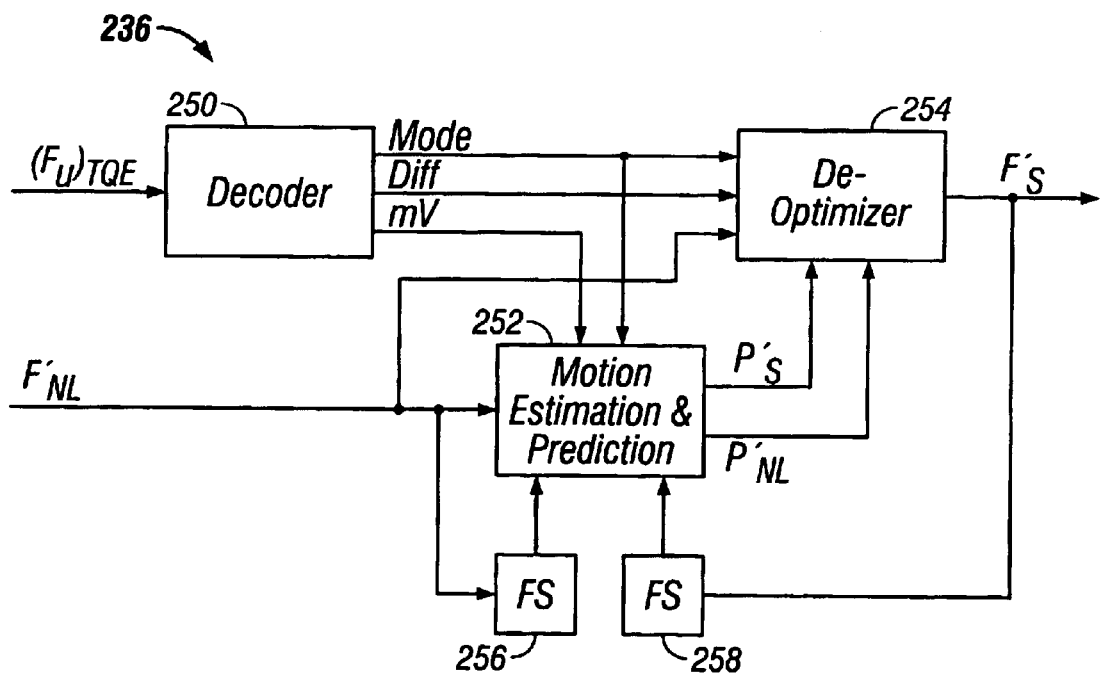
FIG. 14 shows a block diagram of a upper layer decoder in accordance with the present invention.

FIG. 14 shows a block diagram of a upper layer decoder block 236 of FIG. 13 in accordance with the present invention. The encoded upper layer signal $(F_U)_{TQE}$ is received by a decoder 250 which decodes, inverse quantizes and inverse transforms the signal to generate the upper layer signal $F^u$. A motion compensation prediction block 252 receives the recovered mode signal and motion vectors or derives the motion vectors from either or both, of the previously decoded and reconstructed images $F'_R$ and the non-linear processed image $F'_{NL}$, which is generated from the lower layer image $F_D$ by a non-linear processing block 80 such as is shown in FIG. 7. Also, $F'_{NL}$ itself can be used to form the prediction. The motion compensation prediction (MCP) block 252 forms the $P'_S$ and $P'_{NL}$ prediction frames from the motion vectors, the reconstructed $F'_{NL}$ stream and the reconstructed $F'_S$ stream (from the output of de-optimizer block 254) and delayed versions of the $F'_{NL}$ and $F'_S$ streams from frame stores 256, 258. These prediction frames are sent to the de-optimizer block 254 and using the mode signals, the difference signal and the prediction frames the de-optimizer determines the mode that was used to form the difference signal and reconstructs the $F'_S$ image stream. For example, if the mode used was such that $(F_S-F'_{NL})$ was sent, then $F'_S$ is formed by adding $F'_{NL}$ to the difference signal. Alternatively, if the mode was such that $(F_S-P'_S)$ was transmitted, then the predicted frame (or blocks thereof) $P'_S$ is added to the difference image stream to produce $F'_S$ (or blocks thereof). Predicted frames $P'_S$ are derived from motion vectors sent from the encoder (transmitter) or derived locally by the decoder (receiver). As yet another alternative, if the mode was such that $((F_S-F'_{NL}))-(P_S-P'_{NL}))$ was sent, then predicted frames for the source stream $P'_S$ and predicted frames for the non-linear processed stream $P'_{NL}$ must be derived from motion vectors. Again for the $P'_S$ frames, the motion vectors are obtained from the transmitted stream. However, the motion vectors for the non-linear processed stream $P'_{NL}$ are derived from the nonlinear processed stream at the decoder (receiver) and do not need to be sent thus reducing the bit rate of the upper layer encoded image stream. Motion vectors are derived using either the transmitted stream motion vectors or, if possible, motion vectors locally derived from either the $F'_{NL}$ stream or the $F'_S$ stream or both. Locally derived motion vectors are preferred because in that case few motion vectors need to be encoded and sent to the decoder (receiver).

The output of the de-optimizer is the $F'_S$ full resolution image stream which is fed back to a frame store 258 for use by the motion compensation prediction block. To initialize the feedback loop, a non-difference frame (such as an I frame in MPEG-2) is initially sent. Because no motion prediction is needed, the initial output of the de-optimizer is $F'_S$ and this initial frame is stored in the frame store 258 for use in subsequent predictions. The $F'_{NL}$ frames are also stored in a frame store 256 for use in prediction by the motion compensation prediction block.

Figure 15:
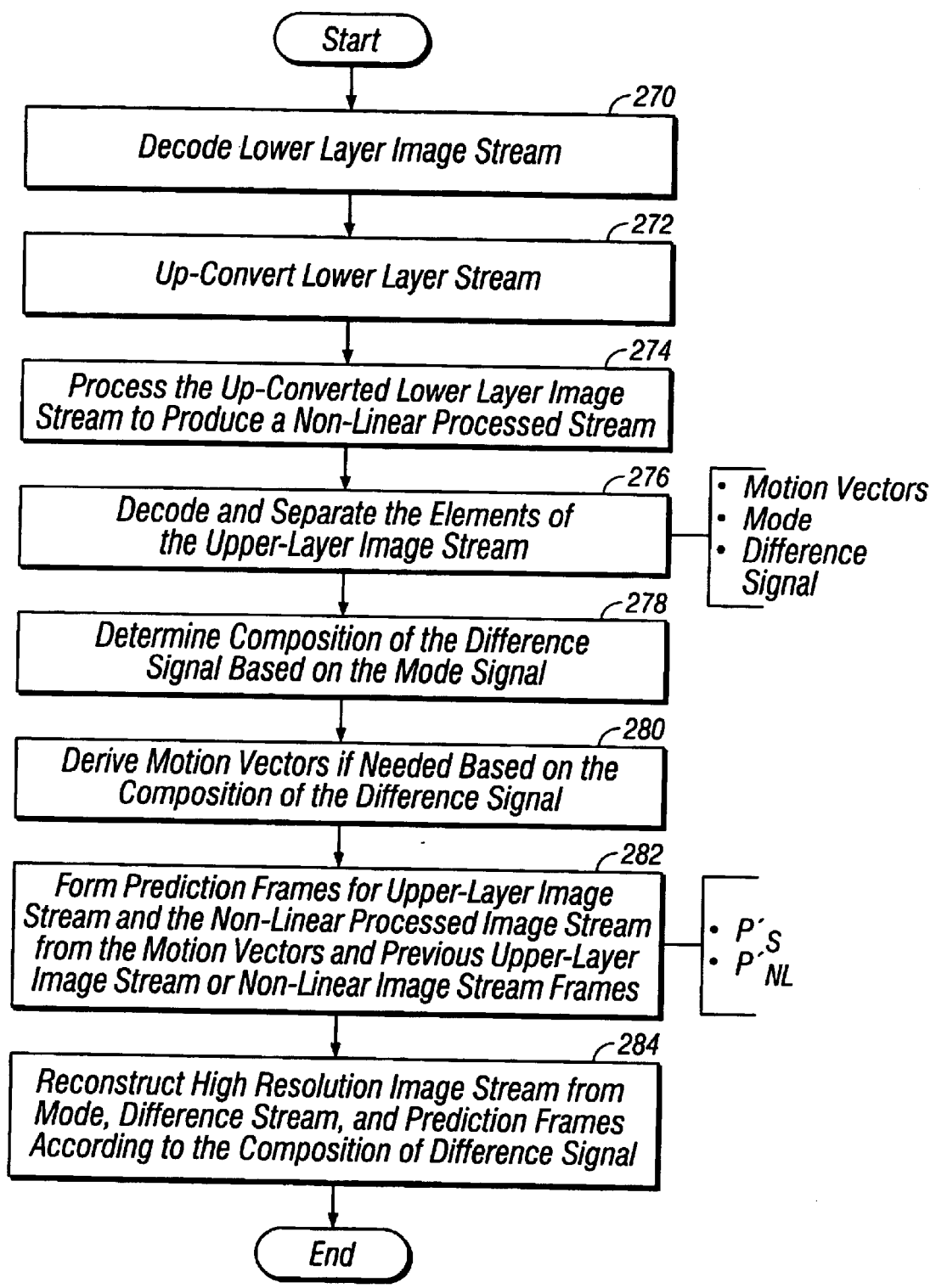
FIG. 15 shows a flow chart of the decoding process in accordance with the present invention.

FIG. 15 shows a flow chart of the decoding process in accordance with the present invention. In step 270, the encoded lower layer image stream is decoded in accordance with the standard by which it was encoded, such as MPEG-2, MPEG-4 or JPEG or other similar standard. Next, the lower-layer image is up-converted in step 272, and in step 274, processed by the nonlinear processing block to form the $F'_{NL}$ image stream which is used in the upper-layer decoding process. Motion vectors can be derived based on this up-converted and non-linear processed image stream and these motion vectors are not transmitted. In step 276, the elements of the upper-layer encoded stream are decoded and separated out into the difference image stream, the mode stream and the motion vector stream. In step 278, the mode by which the difference image stream was constructed is determined and, in step 280, any needed motion vectors are computed. The prediction frames for the source stream and the non-linear processed stream are generated in step 282. Finally, in step 284, the high resolution image stream is reconstructed from the mode stream, the difference image stream, and the prediction frames.

The net result of the encoding and decoding process of the present invention is that a full resolution image $F'_D$ and a high resolution image $F'_S$ are both available from the decoded output, wherein the high resolution image $F'_S$ has been optimally selected to use the least bandwidth. This non-linear process helps to reduce the amount of information that must be sent by the upper layer encoder because image improvements performed by the receiver (decoder) need not be sent by the encoder. Also motion vectors can be derived from this up-converted and non-linear processed image $F'_{NL}$ and do not need to be transmitted. As a consequence, the high resolution image requires significantly less bandwidth to send (or store) than prior art approaches.

In one embodiment in accordance with the present invention, a 1920 by 1080 pixel, interlaced image requires about 8 Mbits/second to send which is less than the same resolution image sent at the same signal-to-noise ratio by prior art techniques. In another embodiment of the invention, a 720 by 480 pixel, interlaced image requires about 700 Kbits/second to send which is less than the same resolution image sent at the same signal-to-noise ratio by prior art techniques. Not only is the bandwidth of the transmission channel reduced but the system and method of the present invention are still compatible with existing standards such as MPEG-2, MPEG-4, or JPEG.

Although the present invention has been described in considerable detail with reference to certain preferred versions thereof, other versions are possible. Therefore, the spirit and scope of the appended claims should not be limited to the description of the preferred versions contained herein.

What is claimed is:

1. A system for encoding a source image stream to produce a lower-layer encoded image stream and an upper-layer encoded image stream, comprising:
    a lower layer encoder that receives the source image stream, generates a down-converted image stream and encodes the down-converted image stream to create the lower-layer encoded image stream, the lower layer encoder forming an up-converted image stream from a decoded version of the lower-layer encoded image stream and including a non-linear processing block for processing the up-converted image stream to generate a non-linear processed image stream; and
    an upper layer encoder that forms the upper layer encoded image stream, the upper layer encoder forming a plurality of upper layer difference streams based on the source image stream and the non-linear processed image stream, selecting one of the upper layer difference streams, and encoding the selected stream to form the upper layer encoded image stream.

2. A system for encoding as recited in claim 1, wherein the non-linear processing block includes:
    a signal processing section that receives a input signal and processes the input signal to form a second differential signal with improved transition times and a non-linearly processed output signal; and
    an indicator-forming section connected to the first signal processing section to form a non-linear signal processing indicator signal from the second differential signal with improved transition times, the non-linear processing indicator indicating when the non-linearly processed output signal is present.

3. A system for encoding as recited in claim 2, wherein the signal processing section includes:
    a first and second delay means that generate a first and second delayed input signal, respectively, from the input;
    a first adder that forms a first differential signal by taking the difference between the second delayed signal and the first delayed signal;
    a second adder that forms a second differential signal by combining a weighted version of the input signal and first delayed input signal with the second delayed input signal;
    an amplifier that amplifies the second differential signal by a predetermined amount;
    a signal clipper that clips the amplified second differential signal to produce the second differential signal with improved transition times;
    a multiplier that multiplies the first differential signal and the second differential signal with improved transition times; and
    a third adder that adds the multiplied signal to the second delayed signal to generate a non-linearly processed output signal.

4. A system for encoding as recited in claim 2, wherein the indicator-forming section includes:
    an absolute value generator that forms an absolute value signal by taking the absolute value of the improved transition-time second differential signal of the input signal;
    a delay means that delays the absolute value signal; and
    an adder that combines the absolute value signal with the delayed absolute value signal to produce the non-linear processed indicator.

5. A system for encoding as recited in claim 4, wherein the adder that combines the absolute value signal with the delayed absolute value signal is an 'OR' gate.

6. A system for encoding as recited in claim 1,
    wherein the non-linear processing block generates a non-linear processing indicator; and
    wherein the lower-layer encoder includes:
        a multi-dimensional low pass filter that limits the bandwidth of the source image stream; and
        a multi-dimensional decimator that sub-samples the bandwidth-limited source image stream to form the down-converted image stream;
    wherein the lower-layer encoder generates a resolution loss indicator by comparing the source image stream to the bandwidth limited source image stream from the multi-dimensional low pass filter; and
    wherein one of the difference streams is a gated difference stream formed from the difference between the source image stream and non-linear processed image stream based on the non-linear processing indicator and the resolution loss indicator.

7. A system for encoding as recited in claim 1,
    wherein the non-linear processing block generates a non-linear processing indicator; and wherein the lower-layer encoder includes:
a down-converter that receives the source image stream and creates the down-converted image stream;
an encoder that forms the lower-layer encoded stream from the down-converted image stream; and
a decoder that reconstructs the down-converted image stream from the lower-layer encoded stream;
wherein the lower-layer encoder generates a compression loss indicator by comparing the down-converted image stream to the reconstructed down-converted image stream; and
wherein one of the difference streams is a gated difference stream formed from the difference between the source image stream and non-linear processed image stream based on the non-linear processing indicator and the compression loss indicator.

8. A system for encoding as recited in claim 1, wherein the upper-layer encoder includes:
a decoder for decoding the upper-layer encoded image stream to form a decoded upper-layer encoded image stream;
a motion estimation and compensation system that generates motion vectors based on the source stream, the non-linear processed, up-converted image stream and the decoded upper-layer encoded image stream, that generates prediction frames of a certain type from the decoded upper layer encoded image stream, the source image stream, the non-linear processed up-converted image stream and the motion vectors and that generates a mode signal indicating each type of prediction frame; and
wherein at least of the difference streams is a motion-compensated difference stream derived from the prediction frames.

9. A system for encoding as recited in claim 1, wherein the upper-layer encoder includes:
a decoder for decoding the upper-layer encoded image stream to form a decoded upper-layer encoded image stream; and
a subtractor that generates a gated difference image stream between the source image stream and the non-linear processed image stream based on the non-linear processed indicator;
a motion estimation and compensation system that generates motion vectors of a particular type from the source image stream, the non-linear processed image stream and the decoded upper-layer encoded image stream, and generates prediction frames from the decoded upper-layer encoded image stream and the motion vectors, wherein a mode signal from the motion compensation system indicates the type of prediction frames;
an optimizer that computes the plurality of difference image streams based on some or all of the source image stream, the non-linear processed image stream, the gated difference image stream and the prediction frames and selects one of the difference image streams for encoding; and
an encoder that encodes the selected difference image stream to form the upper-layer encoded image stream, the encoder including the mode signal in the upper-layer encoded image stream to indicate the difference image stream selected by the optimizer for encoding.

10. A system for encoding as recited in claim 9, wherein the optimizer selects one of the difference image streams based on the sum of the square of the differences between the two image streams from which the difference image stream is formed.

11. A system for encoding as recited in claim 9, wherein one type of prediction frame is a forward prediction frame.

12. A system for encoding as recited in claim 9, wherein one type of prediction frame is a backward prediction frame.

13. A system for encoding as recited in claim 9, wherein one type of prediction frame is a forward and backward prediction frame.

14. A system for encoding as recited in claim 9,
wherein a difference image for the difference image stream is selected from a group consisting of:
an image stream that is derived from the difference between a source stream frame and a prediction frame of the source stream;
an image stream that is derived from the difference between a source stream frame and the mean value of the source stream frame;
an image stream that is derived from the difference between a source stream frame and an up-converted stream frame; and
an image stream that is derived from the difference between (i) the difference between a source stream frame and an up-converted stream frame and (ii) the difference between a prediction frame of the source stream and a prediction frame of the up-converted stream.

15. A system for encoding as recited in claim 14, wherein a prediction frame of the source stream is a forward prediction frame.

16. A system for encoding as recited in claim 14, wherein a prediction frame of the source stream is a backward prediction frame.

17. A system for encoding as recited in claim 14, wherein a prediction frame of the source stream is a backward and forward prediction frame.

18. A method for encoding a source image stream to produce a lower-layer encoded image stream and an upper-layer encoded image stream, comprising:
generating a down-converted source image stream;
encoding the down-converted source image stream to create the lower-layer encoded image stream;
decoding the lower-layer encoded image stream and up-converting the decoded lower-layer image stream;
processing in a non-linear fashion the up-converted image stream to generate a non-linear processed image stream;
forming a plurality of upper-layer difference streams based on the source image stream and the non-linear processed image stream;
selecting an upper-layer difference stream for encoding; and
encoding the selected upper-layer difference stream to form the upper-layer encoded image stream.

19. A method for encoding as recited in claim 18, wherein the step of processing-in a non-linear fashion the up-converted image stream to generate a non-linear processed image stream includes the steps of:
forming an improved transition time second differential signal of the up-converted image stream;
forming an absolute value signal by taking the absolute value of the improved transition time second differential signal;
delaying the absolute value signal; and combining the absolute value signal with the delayed absolute value signal to produce a non-linear processed indicator.

20. A method for encoding as recited in claim 19, wherein the step of combining the absolute value signal with the delayed absolute value signal to produce the non-linear processed indicator is performed by an 'OR' gate.

21. A method for encoding as recited in claim 18,
wherein the step of processing in a non-linear fashion the up-converted image stream to generate a non-linear processed image stream includes the step of generating a non-linear processing indicator; and
wherein the step of forming upper-layer difference streams includes the step of forming a gated difference stream from the difference between the source image stream and the non-linear processed image stream based on the non-linear processing indicator.

22. A method for encoding as recited in claim 21,
wherein the step of generating a down-converted the source image stream includes: filtering the source image stream; and
decimating the filtered image stream to create the down-converted image stream;
further comprising the step of comparing the source image stream to the filtered source image stream to generate a resolution loss indicator; and
wherein the step of forming a gated difference stream is based additionally on the resolution loss indicator, which, in conjunction with the non-linear processing indicator, indicates that the gated difference image stream carries additional resolution information of the source stream.

23. A method for encoding as recited in claim 21,
further comprising the step of comparing the decoded down-converted image stream to the down-converted-image stream to generate a compression loss indicator which indicates where compression losses have occurred; and
wherein the step of wherein the step of forming a gated difference stream is based additionally on the compression loss indicator.

24. A method for encoding as recited in claim 18, wherein the step of selecting an upper-layer difference stream for encoding is based on the sum of the squared error between the two image streams from which the difference image stream is formed.

25. A method for encoding as recited in claim 18,
further comprising the step of decoding the upper-layer encoded image stream to generate the decoded, reconstructed upper-layer encoded image stream; and
wherein the step of forming a plurality of upper-layer difference streams includes the steps of:
generating motion vectors based on the source stream, the non-linear processed, up-converted image stream and the decoded, reconstructed upper-layer encoded image stream;
generating prediction frames of a certain type from the decoded upper-layer encoded image stream, the source image stream and the-non-linear processed, up-converted image stream and the motion vectors; and
generating a mode signal indicating each type of prediction frame; and
deriving at least one of the upper-layer difference streams from the prediction frames.

26. A method for encoding as recited in claim 25, wherein the step of generating prediction frames includes generating a backward prediction frame.

27. A method for encoding as recited in claim 25, wherein the step of generating prediction frames includes generating a forward prediction frame.

28. A method for encoding as recited in claim 25, wherein the step of generating prediction frames includes generating a forward and backward prediction frame.

29. A method for encoding a source image stream to generate a layered, encoded image stream that includes an upper-layer encoded image stream and a lower layer encoded image stream, comprising:
down-converting the source image stream to create a down-converted image stream having a resolution lower than the resolution of the source image stream and to create a resolution lost indicator;
encoding the down-converted image stream to create the lower-layer encoded image stream;
decoding the lower-layer encoded image stream to create a decoded down-converted image stream;
subtracting the decoded down-converted image stream from the down-converted image stream to generate a compression lost indicator;
up-converting the decoded down-converted image stream;
processing the up-converted image stream to create a non-linear processed image stream and a non-linear processing indicator;
forming the difference between the source image stream and the non-linear processed image stream based on the non-linear processing indicator, resolution lost indicator and compression lost indicator to create a gated difference image stream;
deriving the motion vectors based the source image stream, the non-linear processed image stream and a decoded, reconstructed version of the upper-layer encoded image stream;
generating prediction frames and mode signals from the decoded, reconstructed version of the upper-layer encoded image stream and the motion vectors;
forming a plurality of difference image streams from the non-linear processed stream and the input stream and the prediction frames, at least one of the difference image streams including a gated difference image stream based on the non-linear processing indicator;
selecting one of the differences streams for encoding;
encoding the selected difference image stream and the mode signal to form the upper-layer encoded image stream; and
combining the lower-layer encoded image stream with the upper-layer encoded image stream to create a layered encoded image stream.

30. A system for decoding a layered, encoded image stream to generate an upper-layer image stream and a lower layer image stream, comprising:
a first de-multiplexer that separates the layered encoded image stream into a upper-layer encoded image stream and a lower-layer encoded image stream;
a lower-layer decoder that decodes the lower-layer encoded image stream to provide the lower-layer image stream; and
an upper-layer decoder that up-converts the lower-layer image stream and processes the up-converted lower-layer image stream to form a non-linear processed image stream, the upper-layer decoder determining the composition of the upper-layer encoded image stream, and decoding the upper-layer encoded image stream to provide the upper-layer image-stream based on the determined composition of the encoded upper-layer image stream, at least one composition of the encoded upper-layer image stream requiring the non-linear processed image stream to decode the upper-layer encoded image stream.

31. A system for decoding a layered, encoded image stream as recited in claim 30, wherein the upper-layer decoder includes an up-converter that multi-dimensionally interpolates the lower-layer image stream to create a higher resolution up-converted image stream.

32. A system for decoding a layered, encoded image stream as recited in claim 30, wherein the upper-layer decoder includes a non-linear processor that processes the up-converted image stream to form a non-linear processed image stream.

33. A system for decoding a layered, encoded image stream as recited in claim 30, wherein the upper-layer decoder includes:
   a de-multiplexer that separates the upper-layer encoded image stream into a mode stream and a difference steam, the mode stream indicating a composition of the difference stream; a motion estimation and compensation system that generates prediction frames for converting the difference image stream into frames of the upper-layer image stream; and
   a de-optimizer that operates on the difference image stream, using the non-linear processed image stream and the prediction frames depending on the composition of the difference stream, to form the frames of the upper layer image stream.

34. A system for decoding as recited in claim 33, wherein the motion estimation and compensation system derives motion vectors based on non-linear processed image stream, the motion vectors being used to generate prediction frames to be used in forming frames in the upper-layer image stream.

35. A system for decoding as recited in claim 33,
   wherein the de-multiplexer that separates the upper-layer encoded image stream into a mode stream and a difference image stream also separates out a motion vector stream, if present; and
   wherein the motion estimation and compensation system receives the motion vector stream, the mode stream and the upper-layer image stream to generate prediction frames to be used in forming frames in the upper-layer image stream.

36. A system for decoding as recited in claim 33,
   wherein the motion compensation system includes at least one frame store for holding previous frames; and
   wherein upper-layer image frames are stored in the frame store.

37. A method for decoding a layered, encoded image stream to produce a lower-layer image stream and an upper-layer image stream, comprising:
   de-multiplexing the layered encoded image stream into a upper-layer encoded image stream and a lower-layer encoded image stream;
   decoding the lower-layer encoded image stream to provide a lower-layer image stream; up-converting the lower-layer image stream;
   processing the up-converted lower-layer image stream to form a non-linear processed image stream;
   determining the composition of the upper-layer encoded image stream; and
   decoding the upper-layer encoded image stream to provide the upper-layer image stream based on the determined composition of the encoded upper-layer image stream, at least one composition of the encoded upper-layer image stream requiring the non-linear processed image stream to decode the upper-layer encoded image stream.

38. A method for decoding a layered, encoded image stream as recited in claim 37, wherein the step of decoding the upper-layer encoded image stream includes the steps of:
   separating the upper-layer encoded image stream into a mode stream and a difference stream, the mode stream indicating the composition of the difference stream;
   generating prediction frames for converting the difference image stream into frames of the upper-layer image stream; and
   operating on the difference image stream, using the non-linear processed image stream and the prediction frames depending on the composition of the difference stream, to form the frames of the upper layer image stream.

39. A method for decoding a layered, encoded image stream as recited in claim 38,
   wherein the step of generating prediction frames includes:
      deriving motion vectors from the non-linear processed image stream; and
      applying the motion vectors to the non-linear processed image stream to generate prediction frames; and
   wherein the step of operating on the difference stream includes applying the prediction frames to the difference image stream to form the frames of the upper-layer image stream.

40. A method for decoding a layered, encoded image stream as recited in claim 38,
   wherein the step of generating prediction frames includes:
      separating out of the upper-layer encoded image stream a motion vector stream, if present;
      applying the motion vectors to the upper-layer image stream to generate prediction frames; and
   wherein the step of operating on the difference stream includes applying the prediction frames to the difference image stream to form the frames of the upper-layer image stream.

41. A method for decoding a layered, encoded image stream as recited in claim 39 or claim 40,
   wherein the motion vectors are derived for blocks of pixels, the block having a selected: size; and
   wherein the size of the block of pixels is selected from the group consisting of: 16×16 pixels, 8×8 pixels, 4×4 pixels, and 2×2 pixels.

* * * * *